US012603950B2

(12) United States Patent
Yun et al.

(10) Patent No.: US 12,603,950 B2
(45) Date of Patent: Apr. 14, 2026

(54) FOLDABLE ELECTRONIC DEVICE COMPRISING ANTENNA

(71) Applicant: Samsung Electronics Co., Ltd., Suwon-si (KR)

(72) Inventors: Himchan Yun, Suwon-si (KR); Sungkoo Park, Suwon-si (KR); Kyungjae Lee, Suwon-si (KR); Soonho Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 320 days.

(21) Appl. No.: 18/303,274

(22) Filed: Apr. 19, 2023

(65) Prior Publication Data

US 2023/0262151 A1 Aug. 17, 2023

Related U.S. Application Data

(63) Continuation of application No. PCT/KR2021/014486, filed on Oct. 18, 2021.

(30) Foreign Application Priority Data

Oct. 21, 2020 (KR) ........................ 10-2020-0136855

(51) Int. Cl.
H04M 1/02 (2006.01)
H01Q 1/24 (2006.01)

(52) U.S. Cl.
CPC ............ H04M 1/026 (2013.01); H01Q 1/243 (2013.01); H04M 1/0216 (2013.01)

(58) Field of Classification Search
CPC .... H04M 1/026; H04M 1/0216; H01Q 1/243; H01Q 5/30; H01Q 3/30; H01Q 21/29; H01Q 1/2225; H01Q 1/38; H03H 7/0115
See application file for complete search history.

(56) References Cited

U.S. PATENT DOCUMENTS 10,015,294 B2 7/2018 Lee et al.
10,062,954 B2 8/2018 Hong et al.
(Continued)

FOREIGN PATENT DOCUMENTS

CN 106450662 A 2/2017
CN 109687885 A 4/2019
(Continued)

OTHER PUBLICATIONS

Hamouz et al., Efficiency Treatment of Two Closely Spaced Metal Sheets by Characteristic Mode Theory, Department of Electromagnetic Field, Czech Technical University, Apr. 2009.
(Continued)

*Primary Examiner* — Zhitong Chen
(74) *Attorney, Agent, or Firm* — Jefferson IP Law, LLP

(57) ABSTRACT

An electronic device is provided. The electronic device includes a housing, a first antenna including a first portion of a first part, a second antenna including a second portion of a second part, a power distribution circuit electrically connected to the first antenna through a first path and electrically connected to the second antenna through a second path longer than the first path, a wireless communication circuit. The housing comprises the first part, the second part, and a connecting part disposed between the first part and the second part, wherein the first part is coupled to the connecting part so as to be rotatable with respect to the second part, and in a state where the housing is folded, a first point of the first antenna may correspond to a second point of the second antenna.

20 Claims, 23 Drawing Sheets

(56) References Cited

U.S. PATENT DOCUMENTS

| | | | |
|---|---|---|---|
| 10,649,052 | B1 | 5/2020 | Schillak |
| 10,666,327 | B2 | 5/2020 | Son et al. |
| 10,833,397 | B2 | 11/2020 | Lee et al. |
| 11,075,469 | B2 | 7/2021 | Huh et al. |
| 2010/0240327 | A1 | 9/2010 | Lambrecht et al. |
| 2010/0295737 | A1 | 11/2010 | Milosavljevic et al. |
| 2011/0014958 | A1 | 1/2011 | Black et al. |
| 2012/0062429 | A1* | 3/2012 | Uno ........................ H01Q 1/243 |
| | | | 343/702 |
| 2020/0194904 | A1 | 6/2020 | Huh et al. |
| 2020/0321697 | A1 | 10/2020 | Zimmerman et al. |
| 2022/0166132 | A1* | 5/2022 | Chu ..................... H04B 1/0064 |
| 2024/0080002 | A1 | 3/2024 | Kim et al. |

FOREIGN PATENT DOCUMENTS

| | | | | |
|---|---|---|---|---|
| JP | 2003188783 A | * | 7/2003 | ............... H04B 7/08 |
| JP | 2017-126866 A | | 7/2017 | |
| KR | 10-2007-0010361 A | | 1/2007 | |
| KR | 10-0753311 B1 | | 8/2007 | |
| KR | 100885361 B1 | * | 2/2009 | ........... H01Q 9/0421 |
| KR | 10-2010-0061499 A | | 6/2010 | |
| KR | 10-0992919 B1 | | 11/2010 | |
| KR | 10-1604715 B1 | | 3/2016 | |
| KR | 10-2017-0010600 A | | 2/2017 | |
| KR | 10-2019-0061913 A | | 6/2019 | |
| KR | 10-2020-0027734 A | | 3/2020 | |
| KR | 10-2020-0074411 A | | 6/2020 | |
| KR | 10-2020-0101253 A | | 8/2020 | |

OTHER PUBLICATIONS

Korean Office Action dated Oct. 4, 2024, issued in Korean Application No. 10-2020-0136855.

Extended European Search Report dated Feb. 27, 2024, issued in European Application No. 21883158.4-1205.

Indian Office Action dated Mar. 7, 2024, issued in Indian Application No. 202317029948.

Chinese Office Action with English translation dated Jul. 30, 2025; Chinese Appln. No. 202180081726.0.

Korean Notice of Patent Grant with English translation dated May 7, 2025; Korean Appln No. 10-2020-0136855.

* cited by examiner

J1          J2          J4

FOLDABLE ELECTRONIC DEVICE COMPRISING ANTENNA

CROSS-REFERENCE TO RELATED APPLICATION(S)

This application is a continuation application, claiming priority under § 365(c), of an International application No. PCT/KR2021/014486, filed on Oct. 18, 2021, which is based on and claims the benefit of a Korean patent application number 10-2020-0136855, filed on Oct. 21, 2020, in the Korean Intellectual Property Office, the disclosure of which is incorporated by reference herein in its entirety.

BACKGROUND

1. Field

The disclosure relates to an electronic device including an antenna.

2. Description of Related Art

With the development of mobile communication technology, electronic devices including antennas are being widely distributed. The electronic devices may transmit and/or receive a radio frequency (RF) signal including a voice signal or data (e.g., a message, photo, video, music file, or game) by using antennas.

The electronic devices may include a foldable electronic device. For example, the housing of the foldable electronic device may include a first part, a second part, and a connecting portion coupled between the first part and the second part. The foldable electronic device that is foldable or unfoldable around the connecting portion may provide users with portability and usability.

The above information is presented as background information only to assist with an understanding of the disclosure. No determination has been made, and no assertion is made, as to whether any of the above might be applicable as prior art with regard to the disclosure.

SUMMARY

An operating environment of an antenna of a foldable electronic device may vary depending on an angle formed by the first part and the second part around the connecting portion. For example, the foldable electronic device includes a first antenna configured with a portion of a metal frame of the first part and a second antenna configured with a portion of a metal frame of the second part. As the distance between the first antenna and the second antenna decreases, the efficiency of the first antenna and/or the second antenna may decrease due to mutual interference. As another example, since a ground plane of a foldable electronic device that is foldable in response to the folding operation of the foldable electronic device may also operate as a radiating element of an antenna, the operating environment of the antenna may vary depending on the distribution of current flowing on the ground plane.

FIG. 17 illustrates a ground current distribution of an antenna of an electronic device according to an embodiment of the disclosure.

Referring to FIG. 17, the ground current distribution of the electronic device includes J1 mode, J2 mode, and/or J4 mode. The rectangular shape of the ground illustrated in FIG. 17 may be substantially the same as or similar to the shape of the foldable electronic device in an unfolded state.

The foldable electronic device may be foldable around a folding axis A or a folding axis B. When the foldable electronic device is in the folded state, the first part disposed on one side of the central axis and the second part disposed on the other side of the central axis may face each other.

Depending on the ground current distribution, when the directions of currents flowing in the first part and second part in the folded state are the same, it may be called an antenna mode, and when the directions of currents flowing in the first part and the second part are opposite to each other, it may be referred to as a transmission line mode.

For example, in a foldable electronic device having a structure that is folded left and right about the folding axis A in the J1 mode, the antenna mode in which currents in the first part and the second part flow in the same direction may be formed in the folded state, but in a foldable electronic device having a structure that is folded up and down about the folding axis B in the J1 mode, the transmission line mode in which currents of the first part and the second part flow in opposite directions may be formed in the folded state.

As another example, in a foldable electronic device having a structure that is folded about the folding axis A in the J1 mode, the antenna mode may be formed in the folded state, but in a foldable electronic device having a structure that is folded about the folding axis A in the J2 mode, the transmission line mode may be formed in the folded state.

When a first antenna of the first part and a second antenna of the second part operate in the transmission line mode, radiation efficiency may be lowered than when the first antenna and the second antenna operate in the antenna mode.

Aspects of the disclosure are to address at least the above-mentioned problems and/or disadvantages and to provide at least the advantages described below. Accordingly, an aspect of the disclosure is to provide an electronic device capable of improving antenna performance by operating in an antenna mode in the state in which the electronic device is folded.

Additional aspects will be set forth in part in the description which follows and, in part, will be apparent from the description, or may be learned by practice of the presented embodiments.

In accordance with an aspect of the disclosure, an electronic device is provided. The electronic device includes a housing including a first part, a second part, and a connecting portion disposed between the first part and the second part, wherein the first part is coupled to the connecting portion to be rotatable relative to the second part, a first antenna including a first portion of the first part, a second antenna including a second portion of the second part, a power distribution circuit electrically connected to the first point of the first antenna via a first path and electrically connected to the second point of the second antenna via a second path longer than the first path, a wireless communication circuit electrically connected to the first antenna and the second antenna via the power distribution circuit, and at least one element disposed on at least one of the first path and the second path and configured to adjust a phase of an RF signal provided from the wireless communication circuit. In a state in which the housing is folded, the first point of the first antenna may correspond to the second point of the second antenna.

In accordance with an aspect of the disclosure, an electronic device is provided. The electronic device includes a housing including a first side member, a second side member, and a hinge structure disposed between the first side member and the second side member, a flexible display disposed in a recess formed by the first side member and the second side member, a first antenna including a first portion of the first side member, a second antenna including a second portion of the second side member, wherein, in a state in which the housing is folded, the first antenna overlaps the second antenna, a power distribution circuit electrically connected to a first point of the first antenna via a first path and electrically connected to a second point of the second antenna via a second path longer than the first path, a wireless communication circuit electrically connected to the first antenna and the second antenna via the power distribution circuit, a first element disposed on the first path, and a second element disposed on the second path. The first side member is coupled to the hinge structure to be rotatable to the second side member. In the state in which the housing is folded, the first point overlaps the second point. The first element and the second element are configured to adjust the phases of radio frequency (RF) signals provided from the wireless communication circuit.

With an electronic device according to various embodiments of the disclosure, it is possible to suppress the performance of an antenna from deteriorating when the electronic device is in the folded state. In addition, various effects directly or indirectly identified through the disclosure may be provided.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
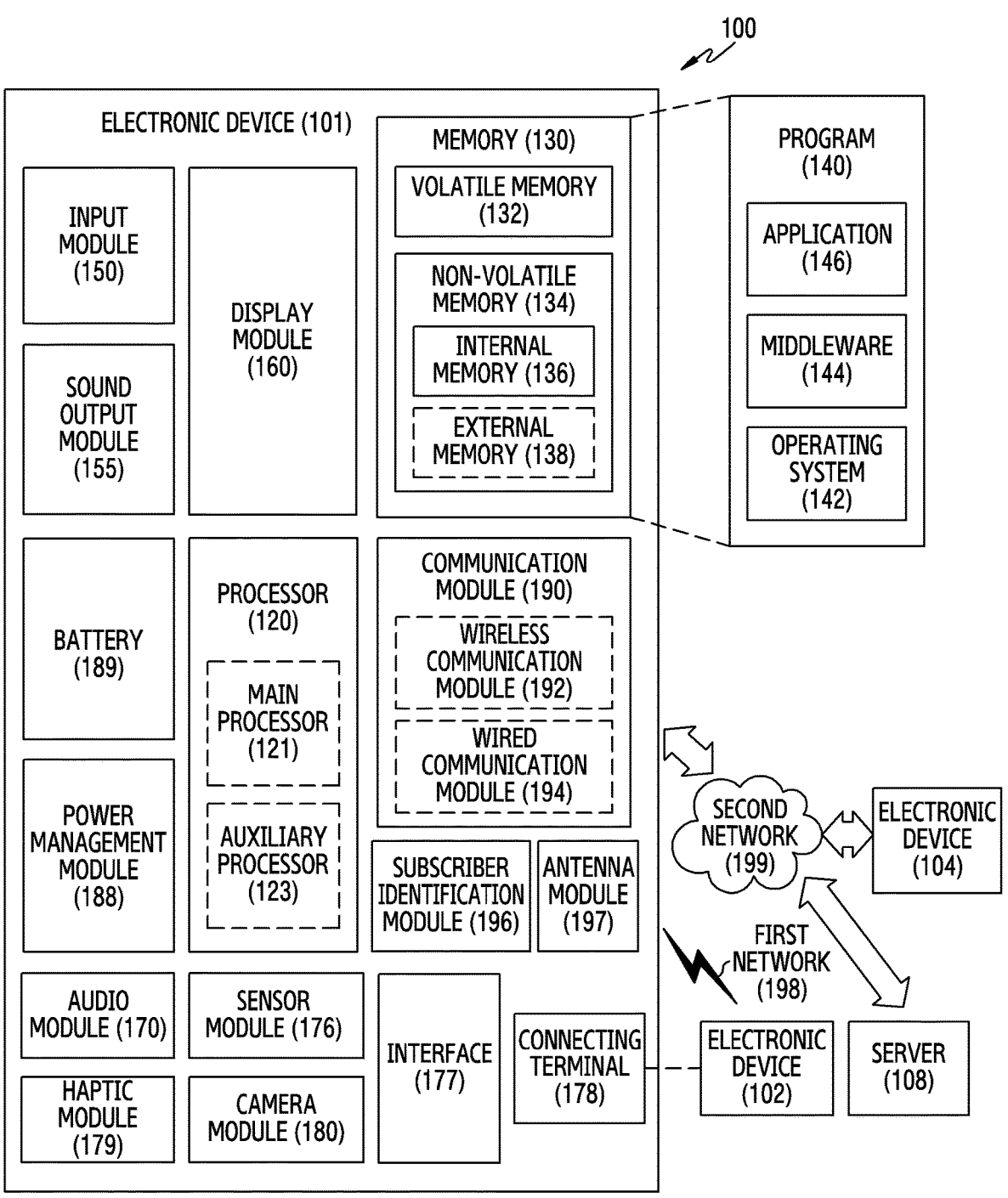
FIG. 1 is a block diagram of an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or at least one of an external electronic device 104 or a server 108 via a second network 199 (e.g., a long-range wireless communication network). According to an embodiment of the disclosure, the electronic device 101 may communicate with the external electronic device 104 via the server 108. According to an embodiment of the disclosure, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments of the disclosure, at least one of the components (e.g., the connecting terminal 178) may be omitted from the electronic device 101, or one or more other components may be added in the electronic device 101. In some embodiments of the disclosure, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment of the disclosure, as at least part of the data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment of the disclosure, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123. According to an embodiment of the disclosure, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment of the disclosure, the display module 160 may include a touch sensor adapted to detect a touch, or a pressure sensor adapted to measure the intensity of force incurred by the touch.

The audio module 170 may convert a sound into an electrical signal and vice versa. According to an embodiment of the disclosure, the audio module 170 may obtain the sound via the input module 150, or output the sound via the sound output module 155 or a headphone of an external electronic device (e.g., the external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly.

According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the external electronic device 102). According to an embodiment of the disclosure, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to one embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fifth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the external electronic device 104), or a network system (e.g., the second network 199). According to an embodiment of the disclosure, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment of the disclosure, the antenna module 197 may include an antenna including a radiating element including a conductive material or a conductive pattern formed in or on a substrate (e.g., a printed circuit board (PCB)). According to an embodiment of the disclosure, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

According to various embodiments of the disclosure, the antenna module 197 may form a mmWave antenna module. According to an embodiment of the disclosure, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment of the disclosure, the external electronic device 104 may include an internet-of-things (IoT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities, and some of the multiple entities may be separately disposed in different components. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

Figure 2:
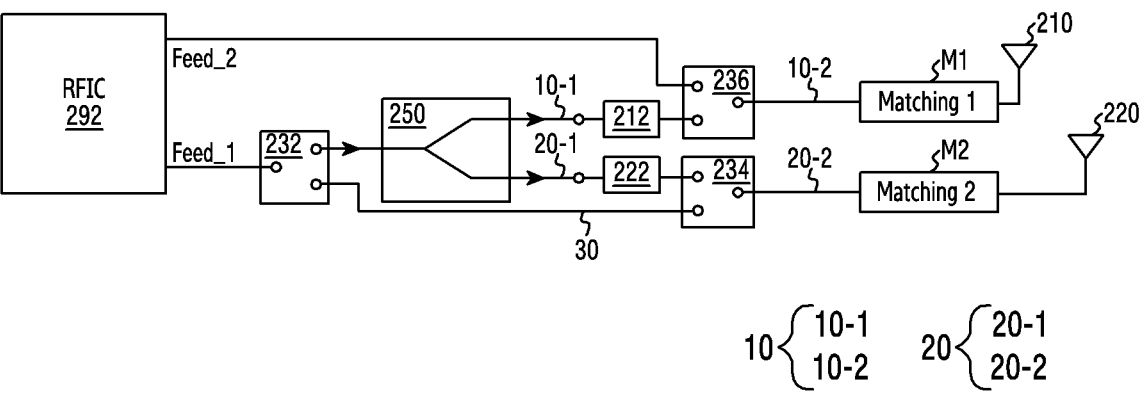
FIG. 2 is a block diagram of an electronic device according to an embodiment of the disclosure.

FIG. 2 is a block diagram of an electronic device according to an embodiment of the disclosure.

Referring to FIG. 2, an electronic device 101 according to an embodiment may include a radio frequency integrated circuit (RFIC) 292, a power divider 250, a first switch 232, a second switch 234, a third switch 236, a first antenna 210, a second antenna 220, a first element 212, and/or a second element 222. The electronic device 101 according to an embodiment may include a first matching element M1 and/or a second matching element M2. According to an embodiment of the disclosure, the radio frequency integrated circuit (RFIC) 292, the power divider 250, the first switch 232, the second switch 234, the third switch 236, and the first element 212, and/or the second element 222 may be disposed on a single printed circuit board.

According to an embodiment of the disclosure, the radio frequency integrated circuit (RFIC) 292, the power divider 250, the first switch 232, the second switch 234, the third switch 236, the first element 212, and the second element 222 may be mounted on a printed circuit board (PCB).

In an embodiment of the disclosure, the RFIC 292 may be electrically connected to the first switch 232 via a first feed path (Feed 1) and to the third switch 236 via a second feed path (Feed 2).

In an embodiment of the disclosure, the processor (e.g., the processor 120 of FIG. 1, an application processor (AP), and a communication processor (CP)) may control at least one of the components illustrated in FIG. 2 (e.g., the first switch 232). For example, the processor may control the first switch 232, the second switch 234, or the third switch 236 based on the folded state or the unfolded state of the electronic device 101.

In an embodiment of the disclosure, the RFIC 292 may convert a baseband signal generated by the processor 120 (e.g., a communication processor) into a radio frequency (RF) signal of a predetermined band upon transmission. In an embodiment of the disclosure, the RFIC 292 may convert an RF signal acquired via the first antenna 210 and/or the second antenna 220 into a baseband signal upon reception.

In an embodiment of the disclosure, the power divider 250 may include a power distribution circuit configured to distribute power of a signal provided via the RFIC 292. In an embodiment of the disclosure, the power divider 250 may branch the signal provided from the RFIC 292 into two signals having an output power of ½ times the input power and may provide the branched signals to the first path 10 and the second path 20.

In an embodiment of the disclosure, the first switch 232 may be electrically connected to the RFIC 292, the power divider 250, and the second switch 234. The first switch 232 may include a double pole single throw (DPST) switch (or a switch circuit) that selectively electrically connects the RFIC 292 to the power divider 250 or the second switch 234. For example, the first switch 232 may be selectively electrically connected to an electrical path connected to the power divider 250 or to a third path 30.

In an embodiment of the disclosure, the second switch 234 may be electrically connected to the first switch 232, the power divider 250, and the second antenna 220. The second switch 234 may include a single pole double throw (SPDT) switch (or switch circuit) that selectively electrically connects the second antenna 220 to the power divider 250 or the first switch 232.

In an embodiment of the disclosure, the third switch 236 may be electrically connected to the RFIC 292, the power divider 250, and the first antenna 210. The third switch 236 may include a double pole single throw (DPST) switch (or switch circuit) that selectively electrically connects the first antenna 210 to the power divider 250 or the RFIC 292.

In an embodiment of the disclosure, the first antenna 210 and the second antenna 220 may include a radiator configured to transmit a radio frequency (RF) signal or to receive a radio frequency (RF) signal and transfer the signal to the RFIC 292.

In an embodiment of the disclosure, the first antenna 210 may be electrically connected to the power divider 250 via the first path 10, and the second antenna 220 may be electrically connected to the power driver 250 via the second path 20. In an embodiment of the disclosure, the physical length of the second path 20 may be longer than the first path 10.

According to an embodiment of the disclosure, due to the physical length difference between the first path 10 and the second path 20, a phase difference may occur between a first signal provided to the first antenna 210 from the power divider 250 via the first path 10 and a second signal provided to the second antenna 220 from the power divider 250 via the second path 20. An electronic device according to an embodiment of the disclosure may include a first element 212 and/or a second element 222 configured to adjust (or compensate for) the phase difference. For example, the first element 212 and/or the second element 222 may compensate for a phase difference between the first signal and the second signal so that the first signal and the second signal are in phase. As another example, the first element 212 and/or the second element 222 may have a difference within a predetermined range even if the phases of the first signal and the second signal are not equal. For example, the predetermined range may be about −45° to about +45°. In an embodiment of the disclosure, the first element 212 may be disposed on a first electrical path 10-1 between the power divider 250 and the third switch 236. The first element 212 may include an inductor having a predetermined inductance value or a capacitor having a predetermined capacitance value. In an embodiment of the disclosure, the second element 222 may be disposed on a third electrical path 20-1 between the power divider 250 and the second switch 234. The second element 222 may include an inductor having a predetermined inductance value or a capacitor having a predetermined capacitance value. For example, in the case of the relatively short first path 10, since the phase change is relatively small, the first element 212 may include an inductor connected in series to the first electrical path 10-1 to increase the phase change. As another example, in the case of the relatively long second path 20, since the phase change is relatively small, the second element 222 may include a capacitor connected in series to the third electrical path 20-1 to decrease the phase change. The types and values of the first element 212 and the second element 222 may be determined depending on the required phases (or phase differences) of signals provided to the first antenna 210 and the second antenna 220.

According to an embodiment of the disclosure, the electronic device 101 may include a first matching element M1 and/or a second matching element M2. In an embodiment of the disclosure, the first matching element M1 may be disposed on the second electrical path 10-2 between the third switch 236 and the first antenna 210 in the first path 10, and the second matching element M2 may be disposed on a fourth electrical path 20-2 between the second switch 234 and the second antenna 220 in the second path 20. The first matching element M1 may include a lumped element (e.g., a radio link control (RLC) element) configured to execute tuning (e.g., impedance matching and/or resonant frequency adjustment) of the first antenna 210. As another example, the second matching element M2 may include a lumped element configured to execute tuning of the second antenna 220.

In an embodiment of the disclosure, an operation in which the RFIC 292 provides signals branched via the power divider 250 to the first antenna 210 and the second antenna 220 will be referred to as an array antenna mode. In an embodiment of the disclosure, when the electronic device 101 operates in the array antenna mode, the first switch 232 may electrically connect the RFIC 292 to the power divider 250, the second switch 234 may electrically connect the power divider 250 and the second antenna 220, and the third switch 236 may electrically connect the power divider 250 and the first antenna 210. In this case, the first signal radiated via the first antenna 210 and the second signal radiated via the second antenna 220 may transmit substantially the same data. According to an embodiment of the disclosure, phases of the first signal and the second signal may be substantially equal to each other. As another example, the phase difference between the first signal and the second signal may be about −45° to about +45°.

The electronic device 101 according to an embodiment may operate the first antenna 210 and the second antenna 220 in the array antenna mode to suppress antenna performance deterioration when the electronic device 101 is in the folded state.

According to an embodiment of the disclosure, when the first antenna 210 and the second antenna 220 need not operate in the array antenna mode (e.g., when the electronic device 101 is unfolded), the electronic device 101 may control the first switch 232, the second switch 234, and the third switch 236 to use the first antenna 210 and/or the second antenna 220 as independent antennas. A mode in which the first antenna 210 and the second antenna 220 operate as independent antennas as described above will be referred to as a default mode. In an embodiment of the disclosure, when the electronic device 101 operates in the basic mode, the first switch 232 may electrically connect the RFIC 292 and the second switch 234, and the second switch 234 may electrically connect the first switch 232 to the second antenna 220 without passing through the power divider 250. As another example, when the electronic device 101 operates in the basic mode, the third switch 236 may electrically connect the RFIC 292 to the first antenna 210 without passing through the power divider 250.

Figure 3:
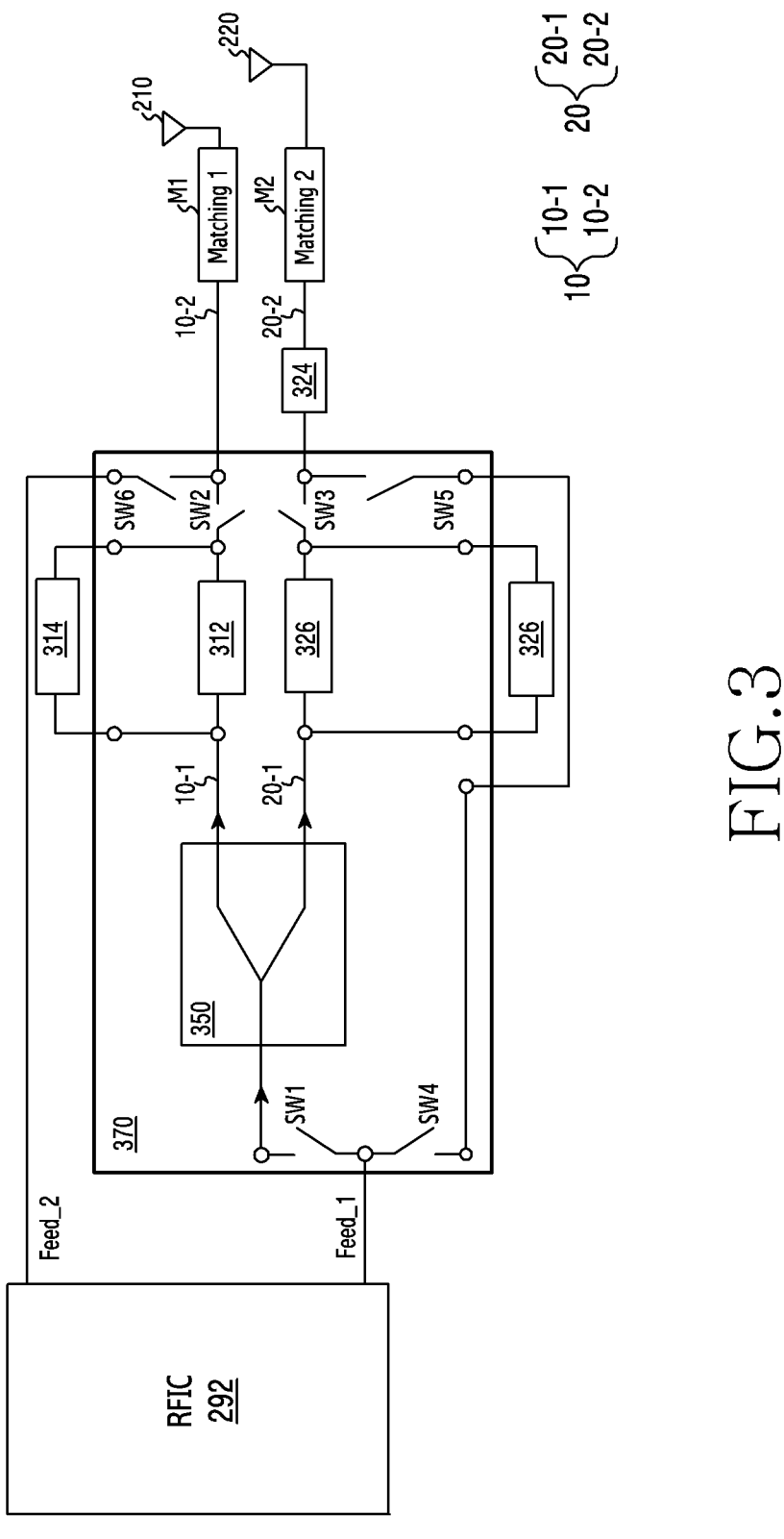
FIG. 3 is a block diagram of an electronic device according to an embodiment of the disclosure.

FIG. 3 is a block diagram of an electronic device according to an embodiment of the disclosure.

Redundant descriptions of components of FIG. 3 having the same reference numerals as those of FIG. 2 will be omitted.

Referring to FIG. 3, an electronic device 101 according to an embodiment may include a phase shifter 370.

In an embodiment of the disclosure, the phase shifter 370 may be understood as being obtained by implementing the power divider 250, the first switch 232, the second switch 234, the third switch 236, and elements for phase adjustment (e.g., the first element 212 and the second element 222) of FIG. 2 as a single integrated circuit (IC).

According to an embodiment of the disclosure, the phase shifter 370 may include at least one of a power divider 350, first to sixth switches SW1 to SW6, a first element 312, and/or a third element 322.

In an embodiment of the disclosure, the power divider 350 may correspond to the power divider 250 of FIG. 2.

In an embodiment of the disclosure, the first switch SW1 and the fourth switch SW4 may correspond to the first switch 232 of FIG. 2.

In an embodiment of the disclosure, the third switch SW3 and the fifth switch SW5 may correspond to the second switch 234 of FIG. 2.

In an embodiment of the disclosure, the second switch SW2 and the sixth switch SW6 may correspond to the third switch 236 of FIG. 2.

In an embodiment of the disclosure, the first element 312 may be connected in series to the first electrical path 10-1 between the power divider 350 and the second switch SW2. The first element 312 may include, for example, a variable capacitor.

In an embodiment of the disclosure, the electronic device 101 may further include a second element 314 when phase compensation using the first element 312 including the variable capacitor is insufficient. For example, the second element 314 may be connected in parallel to the first element 312 in the first electrical path 10-1. The second element 314 may include, for example, an inductor.

In an embodiment of the disclosure, the first element 312 and/or the second element 314 may adjust the phase of a signal provided via the first path 10.

In an embodiment of the disclosure, the third element 322 may be connected in series to the third electrical path 20-1 between the power divider 350 and the second switch SW3. The third element 322 may include, for example, a variable capacitor configured to adjust a phase of a signal provided to the second path 20.

In an embodiment of the disclosure, the variable capacitance value of the first element 312 and the capacitance value of the third element 322 may be determined depending on the phases (or a phase difference) of signals provided to the first antenna 210 and the second antenna 220 via the first path 10 and the second path 20. As another example, the inductance value of the inductor included in the second element 314 may be determined depending on the phases (or a phase difference) of signals provided to the first antenna 210 and the second antenna 220 via the first path 10 and the second path 20.

According to an embodiment of the disclosure, the electronic device 101 may further include a fourth element 324 or a fifth element 326 when phase compensation using the third element 322 including the variable capacitor is insufficient. For example, the electronic device 101 may include a fourth element 324 connected in series to the third element 322 in the fourth electrical path 20-2 of the second path 20 or a fifth element 326 connected in parallel to the third element 322 in the third electrical path 20-1 of the second path 20. The fourth element 324 and/or the fifth element 326 may include, for example, an inductor. The fourth element 324 connected in series to the third element 322 may perform more phase compensation than the fifth element 326 connected in parallel to the third element 322.

Figure 4A:
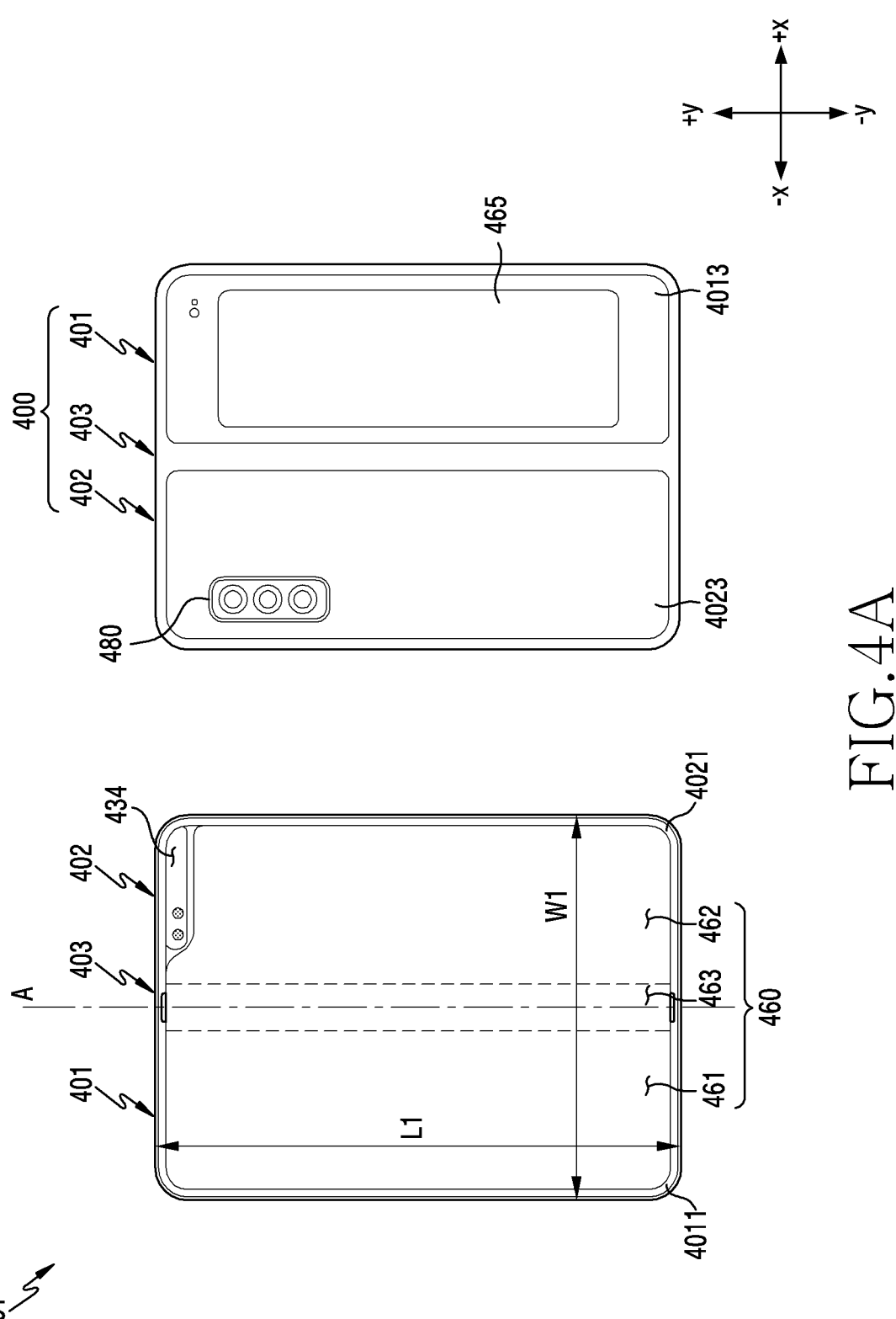
FIG. 4A illustrates an electronic device in an unfolded state according to an embodiment of the disclosure.

FIG. 4A illustrates an electronic device in an unfolded state according to an embodiment of the disclosure.

Figure 4B:
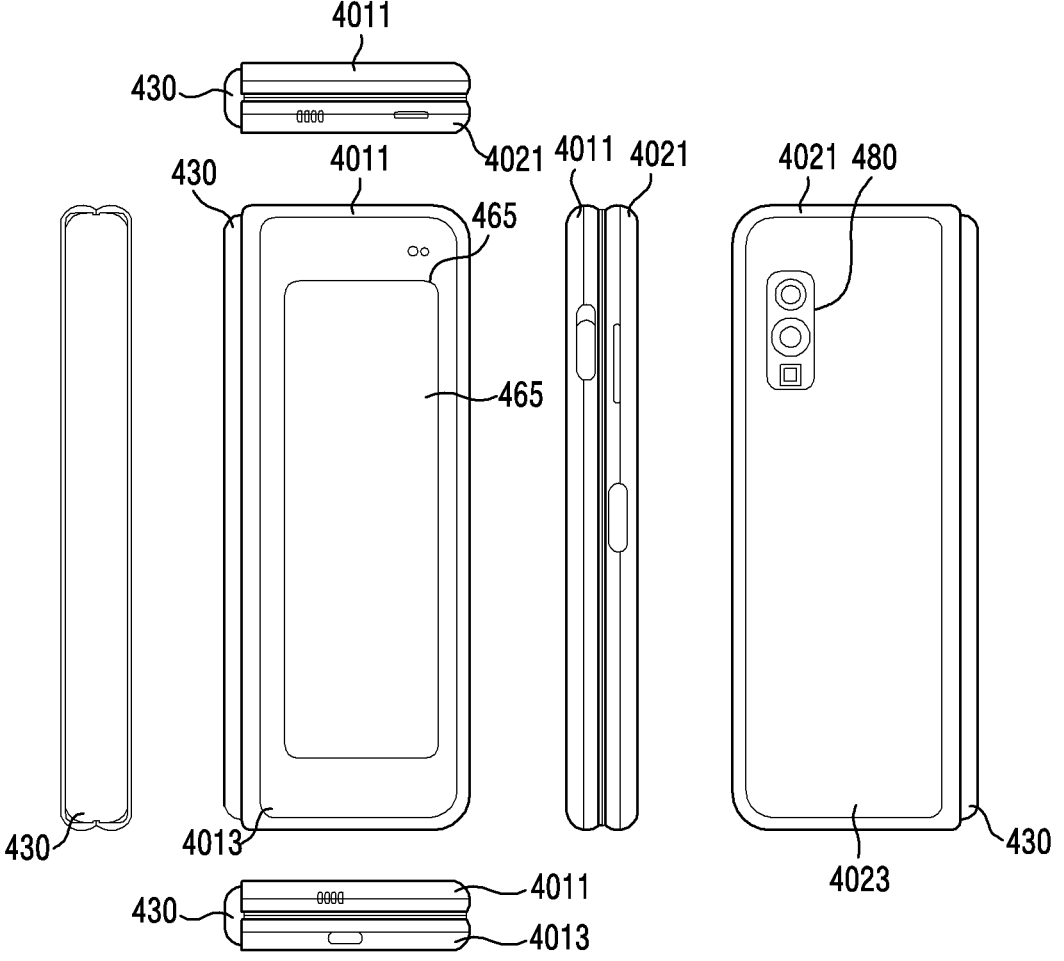
FIG. 4B illustrates the electronic device in a folded state according to an embodiment of the disclosure.

FIG. 4B illustrates the electronic device in a folded state according to an embodiment of the disclosure.

Referring to FIGS. 4A and 4B, in an embodiment of the disclosure, an electronic device 101 may include a foldable housing 400 (hereinafter, referred to as "housing" 400 for short) and a flexible or foldable display 460 (hereinafter, referred to as a "display" 460 for short) disposed in a space defined by the housing 400. Herein, the surface on which the display 460 is disposed is defined as a first surface or the front surface of the electronic device 101. The surface opposite to the front surface is defined as a second surface or the rear surface of the electronic device 101. In addition, the surface surrounding the space between the front and rear surfaces is defined as a third surface or the side surface of the electronic device 101.

In an embodiment of the disclosure, the housing 400 may have a substantially rectangular shape in the unfolded state of FIG. 4A. For example, the housing 400 may have a predetermined width W1 and a predetermined length L1 longer than the predetermined width W1. As another example, the housing 400 may have a predetermined width W1 and a predetermined length L1 that is substantially equal to or shorter than the predetermined width W1. For example, the predetermined width W1 may be the width of the display 460. In an embodiment of the disclosure, the housing 400 of the electronic device 101 may be folded or unfolded around a folding axis A that is substantially parallel to the long edges of the rectangular shape (e.g., the edges oriented in the y-axis direction among edges of the housing 400 of the electronic device 101 in FIG. 4A).

In an embodiment of the disclosure, the housing 400 may include a first part 401, a second part 402, and a connecting portion 403. The connecting portion 403 may be disposed between the first part 401 and the second part 402. The connecting portion 403 may be coupled with the first part 401 and the second part 402, and the first part 401 and/or the second part 402 may be rotated about the connecting portion 403 (or the folding axis A).

In an embodiment of the disclosure, the first part 401 may include a first side surface member 4011 and a first rear surface cover 4013. In an embodiment of the disclosure, the second part 402 may include a second side surface member 4021 and a second rear surface cover 4023.

In an embodiment of the disclosure, the first side surface member 4011 may extend along the edges of the first part 401 and define at least a portion of the side surface of the electronic device 101. The first side surface member 4011 may include at least one conductive portion made of a conductive material (e.g., metal). The conductive portion may operate as an antenna radiator configured to transmit and/or receive an RF signal. Similar to the first side surface member 4011, the second side surface member 4021 may define a portion of the side surface of the electronic device 101, and at least a portion of the second side surface member 4021 may be made of a conductive material to act as an antenna radiator.

In an embodiment of the disclosure, the first side surface member 4011 and the second side surface member 4021 are disposed on opposite sides of the folding axis A and may have substantially symmetrical shapes with respect to the folding axis A.

In an embodiment of the disclosure, the first side surface member 4011 and the second side surface member 4021 form an angle or distance therebetween which varies depending on whether the electronic device 101 is in an unfolded state, a folded state, or an intermediate state.

In an embodiment of the disclosure, the housing 400 may define a recess configured to accommodate the display 460. The recess may correspond to the shape of the display 460.

In an embodiment of the disclosure, a sensor area 434 may be provided to have a predetermined area adjacent to one corner of the second part 402. However, the arrangement, shape, and size of the sensor area 434 are not limited to the illustrated example. For example, in another embodiment of the disclosure, the sensor area 434 may be provided at another corner of the housing 400 or in any area between the upper and lower end corners. As another example, the sensor area 434 may be omitted. For example, components disposed in the sensor area 434 may be disposed below the display 460 or at other locations of the housing 400. In an embodiment of the disclosure, components embedded in the electronic device 101 to execute various functions may be exposed on the front surface of the electronic device 101 through the sensor area 434 or through one or more openings provided in the sensor area 434. In various embodiments of the disclosure, the components may include various types of sensors. The sensors may include, for example, at least one of a front camera, a receiver, and a proximity sensor.

In an embodiment of the disclosure, the first rear surface cover 4013 may be disposed on the first part 401 in the rear surface of the electronic device 101. The first rear surface cover 4013 may have a substantially rectangular periphery. Similar to the first rear surface cover 4013, the second rear surface cover 4023 may be disposed on the second part 402 in the rear surface of the electronic device 101.

In an embodiment of the disclosure, the first rear surface cover 4013 and the second rear surface cover 4023 may have substantially symmetrical shapes about the folding axis A. However, the first rear surface cover 4013 and the second rear surface cover 4023 do not necessarily have mutually symmetrical shapes. In another embodiment of the disclosure, the electronic device 101 may include the first rear surface cover 4013 and/or the second rear surface cover 4023 having various shapes. In still another embodiment of the disclosure, the first rear surface cover 4013 may be configured integrally with the first side surface member 4011, and the second rear surface cover 4023 may be configured integrally with the second side surface member 4021.

In an embodiment of the disclosure, the first rear surface cover 4013, the second rear surface cover 4023, the first side surface member 4011, and the second side surface member 4021 may define a space in which various components (e.g., a printed circuit board or a battery) of the electronic device 101 may be arranged.

In an embodiment of the disclosure, one or more components may be disposed or visually exposed on the rear surface of the electronic device 101. For example, at least a portion of a sub-display 465 may be visually exposed through at least one area of the first rear surface cover 4013. As another example, the rear camera 480 may be visually exposed through at least one area of the second rear surface cover 4023. As another example, the rear camera 480 may be disposed in one area of the rear surface of the electronic device 101.

The housing 400 of the electronic device 101 is not limited to the shape and assembly illustrated in FIGS. 4A and 4B, and may be implemented by a combination and/or an assembly of other shapes or components.

Referring to FIG. 4B, the connecting portion 403 may be implemented to make the first part 401 and the second part 402 mutually rotatable. For example, the connecting portion 403 may include a hinge structure coupled to the first part 401 and the second part 402. In an embodiment of the disclosure, the connecting portion 403 is disposed between the first side surface member 4011 and the second side surface member 4021 and may include a hinge cover 430 configured to cover internal components (e.g., the hinge structure). In an embodiment of the disclosure, the hinge cover 430 may be covered by a portion of the first side surface member 4011 and a portion of the second side surface member 4021 or exposed outside depending on whether the electronic device 101 is in the unfolded state (flat state) or in the folded state.

As an example, as illustrated in FIG. 4A, when the electronic device 101 is in the unfolded state, at least a portion of the hinge cover 430 may not be exposed by being covered by the first side surface member 4011 and the second side surface member 4021. As an example, as illustrated in FIG. 4B, when the electronic device 101 is in the folded state, the hinge cover 430 may not be exposed outside between the first side surface member 4011 and the second side surface member 4021. As an example, when the first side surface member 4011 and the second side surface member 4021 are in the intermediate state of being folded with a certain angle therebetween, a portion of the hinge cover 430 may be partially exposed outside between the first side surface member 4011 and the second side surface member 4021. However, in this case, the exposed area of the hinge cover 430 may be smaller than that in the fully folded state of FIG. 4B.

In an embodiment of the disclosure, the display 460 may be disposed in the space defined by the housing 400. For example, the display 460 may be seated in the recess defined by the housing 400, and may constitute most of the front surface of the electronic device 101. For example, the front surface of the electronic device 101 may include the display 460, and a partial area of the first side surface member 4011 and a partial area of the second side surface member 4021 adjacent to the display 460. As another example, the rear surface of the electronic device 101 may include the first rear surface cover 4013, a partial area of the first side surface member 4011 adjacent to the first rear surface cover 4013, the second rear surface cover 4023, and a partial area of the second side surface member 4021 adjacent to the second rear surface cover 4023.

In an embodiment of the disclosure, the display 460 may include a flexible display in which at least a partial area is transformable into a planar surface or a curved surface. In an embodiment of the disclosure, the display 460 may include a folding area 463, a first area 461, and a second area 462. The folding area 463 may extend along the folding axis A, wherein with reference to the folding area 463, the first area 461 may be disposed on one side (the left side of the folding area 463 illustrated in FIG. 1) and the second area 462 may be disposed on the other side (the right side of the folding area 463 illustrated in FIG. 1). As another example, the first area 461 may be an area disposed on the first part 401, and the second area 462 may be an area disposed on the second part 402. The folding area 463 may be an area disposed on the connecting portion 403.

The area division of the display 460 illustrated in FIG. 1 and the display 460 may be divided into multiple areas (e.g., four or more areas or two areas) depending on the structure or function thereof. As an example, in the embodiment illustrated in FIG. 1, the areas of the display 460 may be divided by the folding area 463 or the folding axis A. However, in another embodiment of the disclosure, the areas of the display 460 may be divided with reference to other folding areas (e.g., the folding area 463 in FIG. 11A) or other folding axes (e.g., the folding axis B in FIG. 11A).

In an embodiment of the disclosure, the first area 461 and the second area 462 may have generally symmetrical shapes about the folding area 463. However, unlike the first area 461, the second area 462 may include a notch cut due to the presence of the sensor area 434, but may have a shape symmetrical to the first area 461 in areas other than the sensor area. For example, the first area 461 and the second area 462 may include portions having mutually symmetrical shapes and portions having mutually asymmetrical shapes.

Hereinafter, the operations of the first side surface member 4011 and the second side surface member 4021 and respective areas of the display 460 according to the states of the electronic device 101 (e.g., the unfolded state and the folded state) will be described.

In an embodiment of the disclosure, when the electronic device 101 is in the unfolded state (e.g., FIG. 1), the first side surface member 4011 and the second side surface member 4021 may be disposed to form an angle of about 180 degrees therebetween and to face the same direction. The surface of the first area 461 and the surface of the second area 462 of the display 460 may form about 180 degrees relative to each other and may face substantially the same direction (e.g., the front of the electronic device). The folding area 463 may form the same plane as the first area 461 and the second area 462.

In an embodiment of the disclosure, when the electronic device 101 is in the folded state (e.g., FIG. 2), the first side surface member 4011 and the second side surface member 4021 may be disposed to face each other. The surface of the first area 461 and the surface of the second area 462 of the display 460 may face each other while forming a narrow angle (e.g., an angle between 0 and 10 degrees) relative to each other. At least a portion of the folding area 463 may be configured as a curved surface having a predetermined curvature.

In an embodiment of the disclosure, when the electronic device 101 is in the intermediate state, the first side surface member 4011 and the second side surface member 4021 may be disposed to form a certain angle therebetween. The surface of the first area 461 and the surface of the second area 462 of the display 460 may form an angle greater than that in the folded state and smaller than that in the unfolded state. At least a portion of the folding area 463 may have a curved surface having a predetermined curvature, and the curvature at this time may be smaller than that in the folded state.

Figure 5:
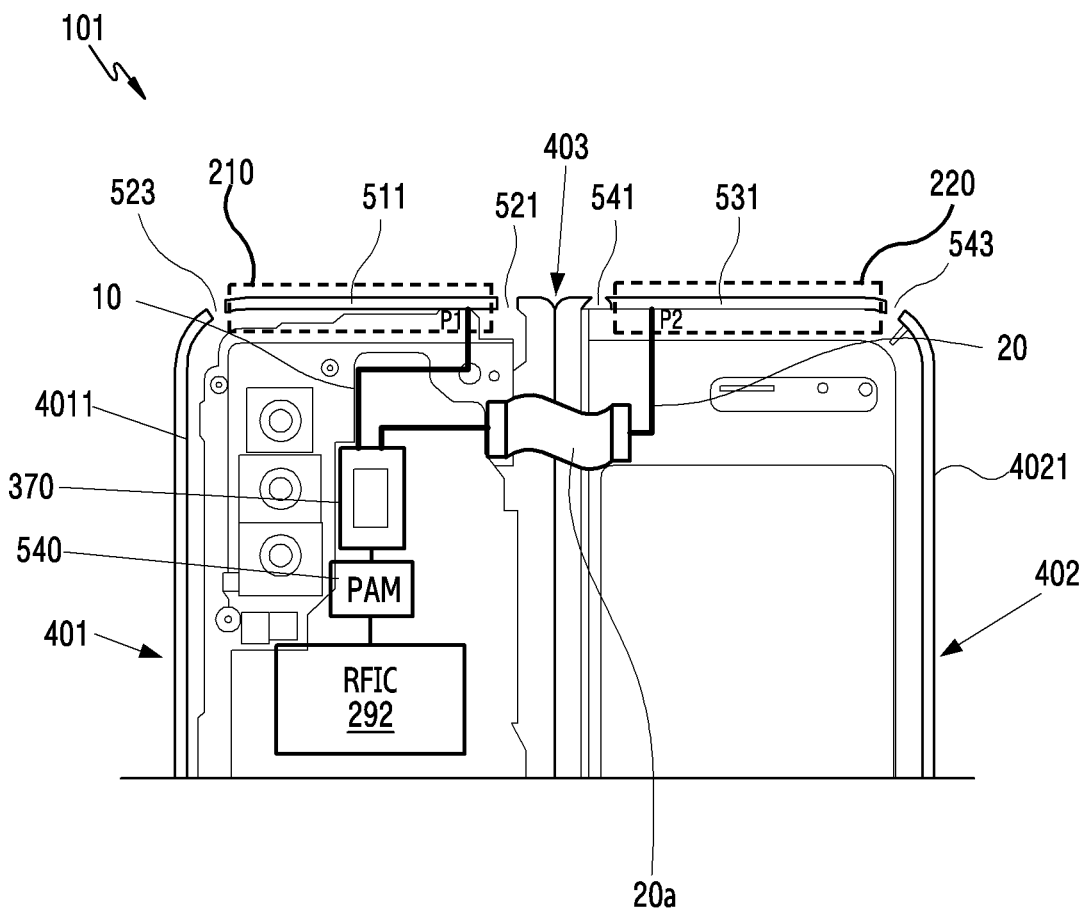
FIG. 5 illustrates an electronic device according to an embodiment of the disclosure.

FIG. 5 illustrates an electronic device according to an embodiment of the disclosure.

Redundant descriptions of components of FIG. 5 having the same reference numerals as those described above will be omitted.

Referring to FIG. 5, a first portion 511 of the first side surface member 4011 may define a portion of an edge of the first side surface member 4011. In an embodiment of the disclosure, the first portion 511 may be fed with power at the first point P1 via the first path 10 from the RFIC 292 and may operate as the first antenna 210 configured to transmit and/or receive an RF signal of a predetermined band. In an embodiment of the disclosure, the first portion 511 may include a conductive material.

In an embodiment of the disclosure, a first split portion 521 may be provided at one end of the first portion 511 and a second split portion 523 may be provided at the other end of the first portion 511. The first split portion 521 and the second split portion 523 may electrically separate the first portion 511 made of a conductive material from other portions of the first side surface member 4011. In an embodiment of the disclosure, the first split portion 521 and the second split portion 523 may include a material having a predetermined permittivity or a non-conductive material (e.g., air or resin).

In an embodiment of the disclosure, a second portion 531 of the second side surface member 4021 may define a portion of an edge of the second side surface member 4021.

In an embodiment of the disclosure, the second portion 531 may be fed with power at the second point P2 via the second path 20 from the RFIC 292 and may operate as the second antenna 220 configured to transmit and/or receive an RF signal of a predetermined band. In an embodiment of the disclosure, the second portion 531 may include a conductive material. In an embodiment of the disclosure, the second path 20 may include a flexible printed circuit board RF cable (FRC) 20a crossing the connecting portion 403.

In an embodiment of the disclosure, a third split portion 541 may be provided at one end of the second portion 531 and a fourth split portion 543 may be provided at the other end of the second portion 531. The third split portion 541 and the fourth split portion 543 may electrically separate the second portion 531 made of a conductive material from other portions of the second side surface member 4021. In an embodiment of the disclosure, the third split portion 541 and the fourth split portion 543 may include a material having a predetermined permittivity or a non-conductive material (e.g., air or resin).

The electronic device 101 according to an embodiment may include a power amplifier module (PAM) 540 disposed on an electrical path between the phase shifter 370 and the RFIC 292. The PAM 540 may include, for example, a power amplifier configured to amplify a signal provided from the RFIC 292.

In an embodiment of the disclosure, the first portion 511 and the second portion 531 may correspond to each other. For example, the first portion 511 and the second portion 531 may be positioned at the same edge in the state in which the electronic device 101 is unfolded. As another example, the first portion 511 and the second portion 531 may overlap each other in the state in which the electronic device 101 is folded. For example, when viewed from above the rear surface of the first part 401 in the state in which the electronic device 101 is folded, the first portion 511 may overlap the second portion 531.

In an embodiment of the disclosure, a short-end of the first portion 511 (the end of the first portion 511 close to the first point P1) and a short-end of the second portion 531 (the end of the second portion 531 close to the second point P2) may overlap each other and may face the same direction (e.g., a direction toward the connecting portion 403) in the state in which the electronic device 101 is folded.

In an embodiment of the disclosure, an open-end of the first portion 511 (the end of the first portion 511 far from the first point P1) and an open-end of the second portion 531 (the end of the second portion 531 far from the second point P2) may overlap each other and may face the same direction (e.g., a direction opposite to the connecting portion 403) in the state in which the electronic device 101 is folded.

In an embodiment of the disclosure, the first point P1 of the first portion 511 and the second point P2 of the second portion 531 may correspond to each other. For example, in the state in which the electronic device 101 is folded, the first point P1 of the first portion 511 may substantially overlap the second point P2 of the second portion 531. For example, when viewed from above the rear surface of the first part 401 in the state in which the electronic device 101 is folded, the first point P1 and the second point P2 may overlap each other. As another example, even when the first point P1 and the second point P2 do not overlap in the state in which the electronic device 101 is folded, the first point P1 and the second point P2 may be arranged to be more biased toward the connecting portion 403 than the outside of the electronic device 101.

In an embodiment of the disclosure, in order to make the electronic device 101 operate in the antenna mode, the phase shifter 370 may be configured to adjust the phase of the first signal provided to the first portion 511 via the first path 10 and the phase of the second signal provided to the second portion 531 via the second path 20.

Figure 17:
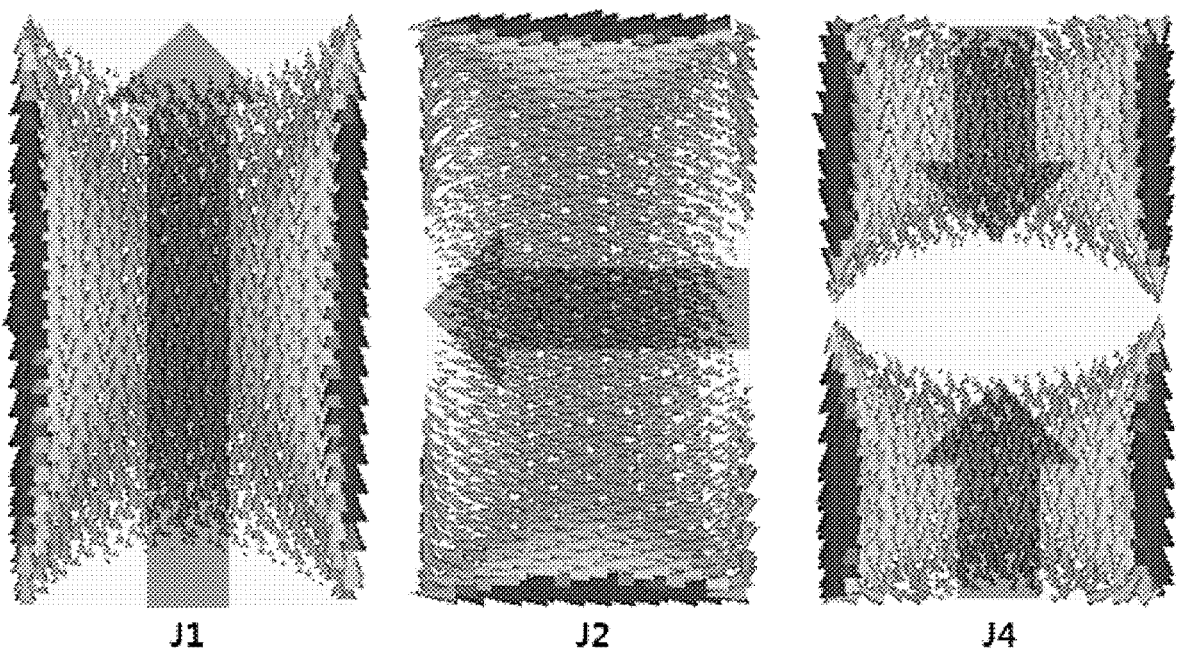
FIG. 17 illustrates ground current distributions of an antenna of an electronic device according to an embodiment of the disclosure.

For example, in the electronic device 101 according to an embodiment of the disclosure, a first signal and a second signal having the same phase may be provided to the first portion 511 and the second portion 531 by using a phase shifter 370. In this case, even when the electronic device 101 is folded, the current flowing to the ground corresponding to the first part 401 and the current flowing to the ground corresponding to the second part 402 may be formed in the same direction (e.g., the J1 mode when folded about axis A in FIG. 17).

Figure 6:
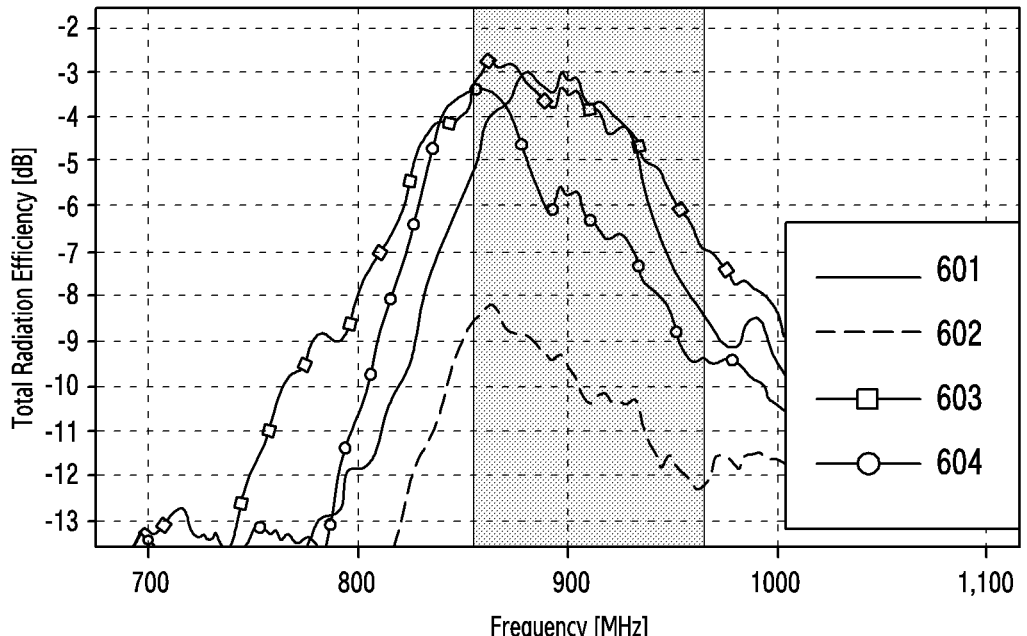
FIG. 6 is a graph showing radiation efficiencies of a first antenna and a second antenna according to an embodiment of the disclosure.

FIG. 6 is a graph showing radiation efficiencies of a first antenna and a second antenna according to an embodiment of the disclosure.

Reference numeral 601 in FIG. 6 indicates antenna radiation efficiency when the first antenna 210 and the second antenna 220 operate in the basic mode in the state in which the electronic device 101 is unfolded. For example, referring to FIG. 3, reference numeral 601 indicates antenna radiation efficiency when the RFIC 292 feeds power to the first antenna 210 via the second feed path (Feed 2) and the sixth switch SW6 or feeds power to the second antenna 220 via the first feed path (Feed 1), the fourth switch SW4, and the fifth switch SW5 in the state in which the electronic device 101 is unfolded.

Reference numeral 602 in FIG. 6 indicates antenna radiation efficiency when the first antenna 210 and the second antenna 220 operate in the basic mode in the state in which the electronic device 101 is unfolded. For example, referring to FIG. 3, reference numeral 602 indicates antenna radiation efficiency when the RFIC 292 feeds power to the first antenna 210 via the second feed path (Feed 2) and the sixth switch SW6 or feeds power to the second antenna 220 via the first feed path (Feed 1), the fourth switch SW4, and the fifth switch SW5 in the state in which the electronic device 101 is folded. Reference numeral 602 in FIG. 6 may indicate antenna radiation efficiency when the current flowing to the ground corresponding to the first part 401 and the ground corresponding to the second part 402 are formed in opposite directions (the transmission line mode).

Reference numeral 603 in FIG. 6 indicates antenna radiation efficiency when the first antenna 210 and the second antenna 220 operate in the array antenna mode in the state in which the electronic device 101 is unfolded. For example, referring to FIG. 3, reference numeral 603 may indicate antenna radiation efficiency when the RFIC 292 feeds power to the first antenna 210 and the second antenna 220 via the first path 10 and the second path 20 in the state in which the electronic device 101 is unfolded.

Reference numeral 604 in FIG. 6 indicates antenna radiation efficiency when the first antenna 210 and the second antenna 220 operate in the array antenna mode in the state in which the electronic device 101 is folded. For example, referring to FIG. 3, reference numeral 604 may indicate antenna radiation efficiency when the RFIC 292 feeds power to the first antenna 210 and the second antenna 220 via the first path 10 and the second path 20 in the state in which the electronic device 101 is folded. Reference numeral 604 in FIG. 6 may indicate antenna radiation efficiency when the current flowing to the ground corresponding to the first part 401 and the current flowing to the ground corresponding to the second part 402 are formed in the same direction by adjusting the phases of the signals provided to the first antenna 210 and the second antenna 220 (the antenna mode).

Figure 7A:
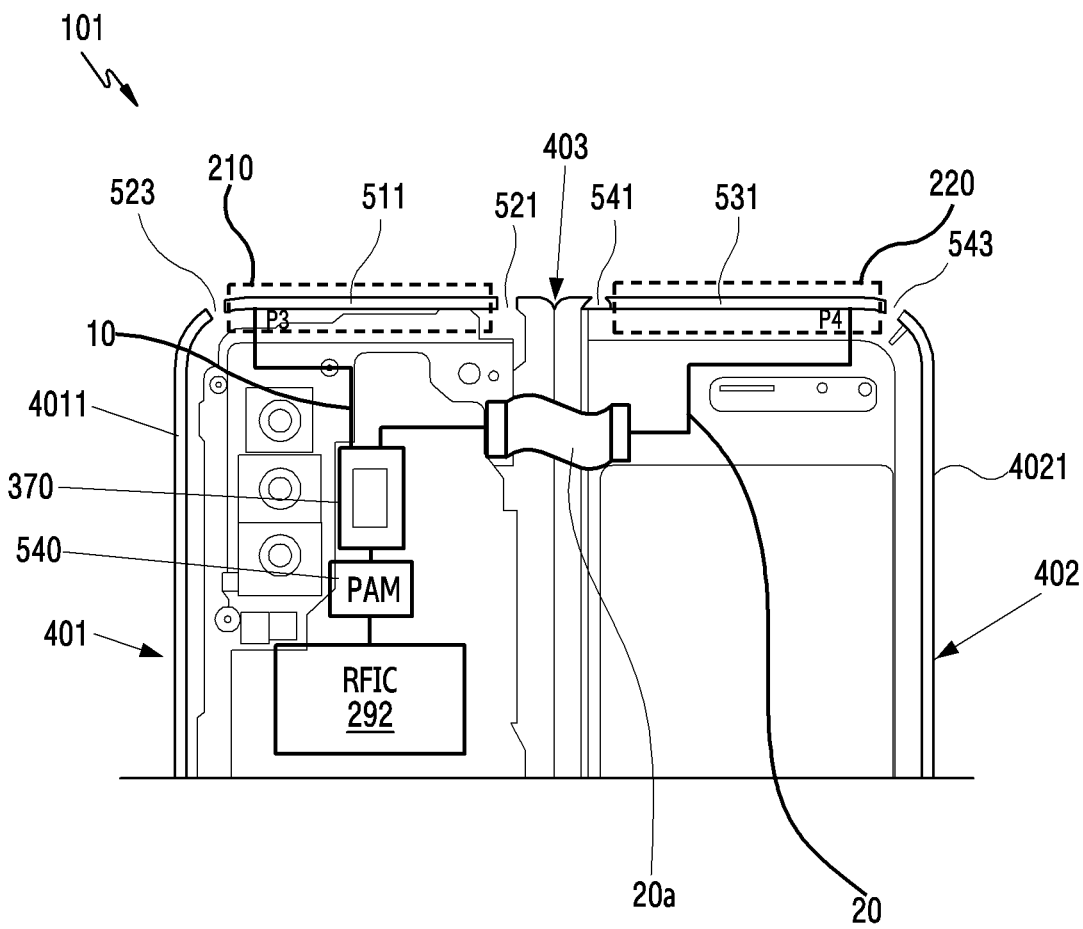
FIG. 7A illustrates an electronic device according to an embodiment of the disclosure.
Figure 7B:
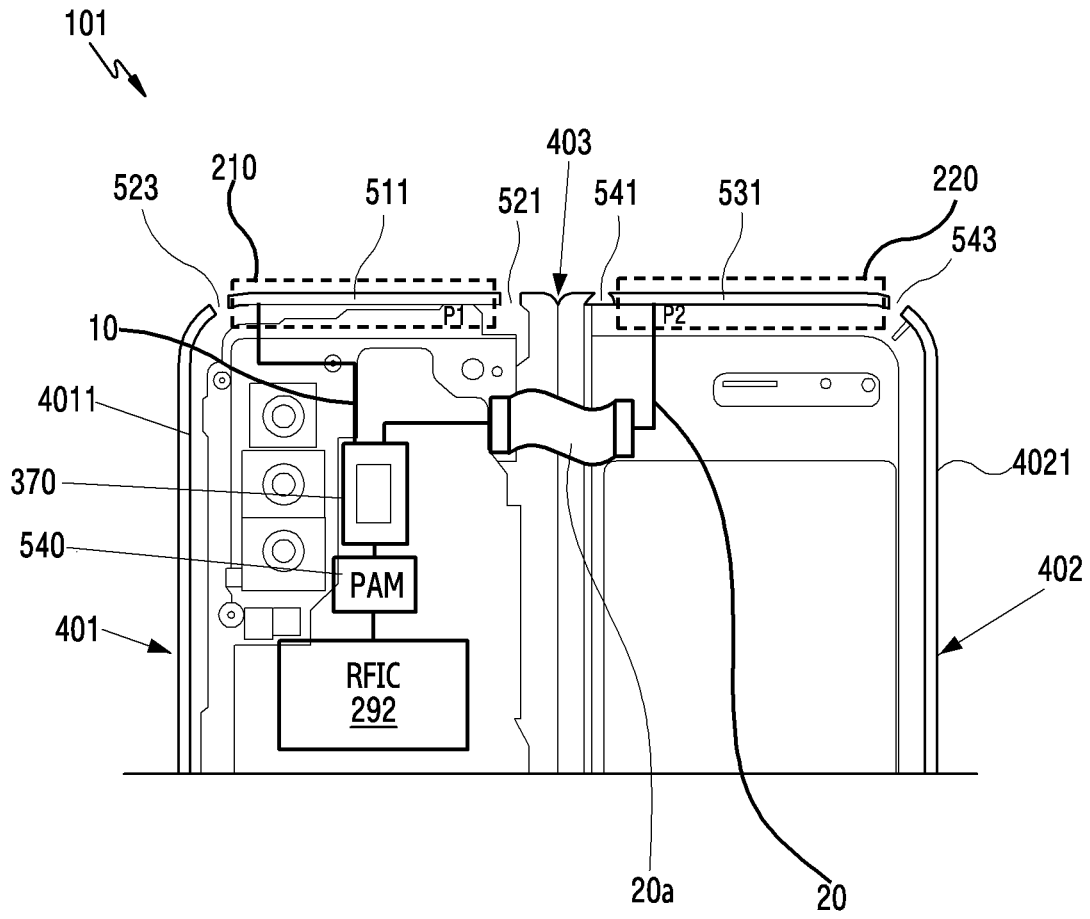
FIG. 7B illustrates an electronic device according to an embodiment of the disclosure.

The electronic device 101 according to an embodiment may adjust the phases of the signals provided to the first antenna 210 and the second antenna 220 to suppress the first ground corresponding to the first part 401 and the second ground corresponding to the second part 402 from operating in the transmission line mode and to make the first ground and the second ground operate in the antenna mode in the state in which the electronic device is folded, thereby improving the radiation efficiencies of the first antenna 210 and the second antenna 220. In an example, in order to operate in the antenna mode, the electronic device 101 may adjust the phases in advance at a circuit stage to be in phase or out of phase at the power feeding points of the first antenna 210 and the second antenna 220. As an example, when power feeding points P3 and P4 are provided at positions facing each other in the state in which the electronic device 101 is folded as illustrated in FIG. 7A, the same phase may be formed, and when power feeding points P3 and P2 are provided at positions that do not face each other in the state in which the electronic device 101 is folded as illustrated in FIG. 7B, the anti-phase may be formed. For example, referring to FIG. 6, in the state in which the electronic device 101 is folded, the antenna radiation efficiency when the electronic device 101 operates in the antenna mode (reference numeral 603) may be more improved than the antenna radiation efficiency when the electronic device 101 operates in the transmission line mode (reference numeral 602). In an embodiment of the disclosure, the electronic device 101 may adjust the phase of the first signal fed to the first point P1 and the phase of the second signal fed to the second point P2 to be substantially the same by using the phase shifter 370. For example, the first signal radiated via the first antenna 210 and the second signal radiated via the second antenna 220 may transmit substantially the same data.

FIG. 7A illustrates an electronic device according to an embodiment of the disclosure. Redundant descriptions of components of FIG. 7A having the same reference numerals as those described above will be omitted.

Referring to FIG. 7A, in an embodiment of the disclosure, the first portion 511 may be fed with power at the third point P3 via the first path 10 from the RFIC 292 and may operate as the first antenna 210 configured to transmit and/or receive an RF signal of a predetermined band.

In an embodiment of the disclosure, the second portion 531 may be fed with power at the fourth point P4 via the second path 20 from the RFIC 292 and may operate as the second antenna 220 configured to transmit and/or receive an RF signal of a predetermined band.

In an embodiment of the disclosure, the second path 20 may include a flexible printed circuit board RF cable (FRC) 20a crossing the connecting portion 403. In an example, the FRC 20a may be configured as a separate F-PCB and disposed between PCBs. The description of the FRC 20a is applied to FIGS. 7B and 7C as it is.

In an embodiment of the disclosure, when viewed from above the rear surface of the first part 401, a short-end of the first portion 511 (the end of the first portion 511 close to the third point P3) and a short-end of the second portion 531 (the end of the second portion 531 close to the fourth point P4) may overlap each other and may face the same direction (e.g., a direction from the connecting portion 403 toward the outside of the electronic device 101) in the state in which the electronic device 101 is folded.

In an embodiment of the disclosure, when viewed from above the rear surface of the first part 401, an open-end of the first portion 511 (the end of the first portion 511 far from the third point P3) and an open-end of the second portion 531 (the end of the second portion 531 far from the fourth point P4) may overlap each other and may face the same direction (e.g., a direction toward the connecting portion 403) in the state in which the electronic device 101 is folded.

In an embodiment of the disclosure, the third point P3 of the first portion 511 and the fourth point P4 of the second portion 531 may correspond to each other. For example, when viewed from above the rear surface of the first part 401 in the state in which the electronic device 101 is folded, the third point P3 of the first portion 511 may substantially overlap the fourth point P4 of the second portion 531. As another example, even when the third point P3 and the fourth point P4 do not overlap in the state in which the electronic device 101 is folded, the third point P3 and the fourth point P4 may be arranged to be more biased toward the outside of the electronic device 101 than the connecting portion 403 of the electronic device 101.

In an embodiment of the disclosure, the phase of the first signal fed to the first antenna 210 and the phase of the second signal fed to the second antenna 220 may be adjusted such that the first antenna 210 including the first portion 511 and the second antenna 220 including the second portion 531 can operate in the antenna mode. For example, the phase of the first signal fed to the third point P3 and the phase of the second signal fed to the fourth point P4 may be substantially the same phase.

In an embodiment of the disclosure, the first antenna 210 including the first portion 511 and the second antenna 220 including the second portion 531 may be configured to transmit and/or receive signals of substantially the same frequency band. The first signal radiated via the first antenna 210 and the second signal radiated via the second antenna 220 may transmit substantially the same data.

FIG. 7B illustrates an electronic device according to an embodiment of the disclosure.

Redundant descriptions of components of FIG. 7B having the same reference numerals as those described above will be omitted.

Referring to FIG. 7A, in an embodiment of the disclosure, the first portion 511 may be fed with power at the third point P3 via the first path 10 from the RFIC 292 and may operate as the first antenna 210 configured to transmit and/or receive an RF signal of a predetermined band.

In an embodiment of the disclosure, the second portion 531 may be fed with power at the second point P2 via the second path 20 from the RFIC 292 and may operate as the second antenna 220 configured to transmit and/or receive an RF signal of a predetermined band.

In an embodiment of the disclosure, when viewed from above the rear surface of the first part 401, a short-end of the first portion 511 (the end of the first portion 511 close to the third point P3) and an open-end of the second portion 531 (the end of the second portion 531 far from the second point P2) may overlap each other and may face the same direction (e.g., a direction from the connecting portion 403 toward the outside of the electronic device 101) in the state in which the electronic device 101 is folded.

In an embodiment of the disclosure, when viewed from above the rear surface of the first part 401, an open-end of the first portion 511 (the end of the first portion 511 far from the third point P3) and a short-end of the second portion 531 (the end of the second portion 531 close to the second point P2) may overlap each other and may face the same direction (e.g., a direction toward the connecting portion 403) in the state in which the electronic device 101 is folded.

In an embodiment of the disclosure, the third point P3 of the first portion 511 may be disposed closer to the second split portion 523 than the first split portion 521 in the first portion 511, and the second point P2 of the second portion 531 may be disposed closer to the third split portion 541 than the fourth split portion 543 in the second portion 531.

In an embodiment of the disclosure, the phase of the first signal fed to the first antenna 210 and the phase of the second signal fed to the second antenna 220 may be adjusted such that the first antenna 210 including the first portion 511 and the second antenna 220 including the second portion 531 can operate in the antenna mode. For example, the phase of the first signal fed to the third point P3 and the phase of the second signal fed to the second point P2 may be out of phase.

In an embodiment of the disclosure, the first antenna 210 including the first portion 511 and the second antenna 220 including the second portion 531 may be configured to transmit and/or receive signals of substantially the same frequency band. For example, the first signal radiated via the first antenna 210 and the second signal radiated via the second antenna 220 may transmit substantially the same data.

Figure 7C:
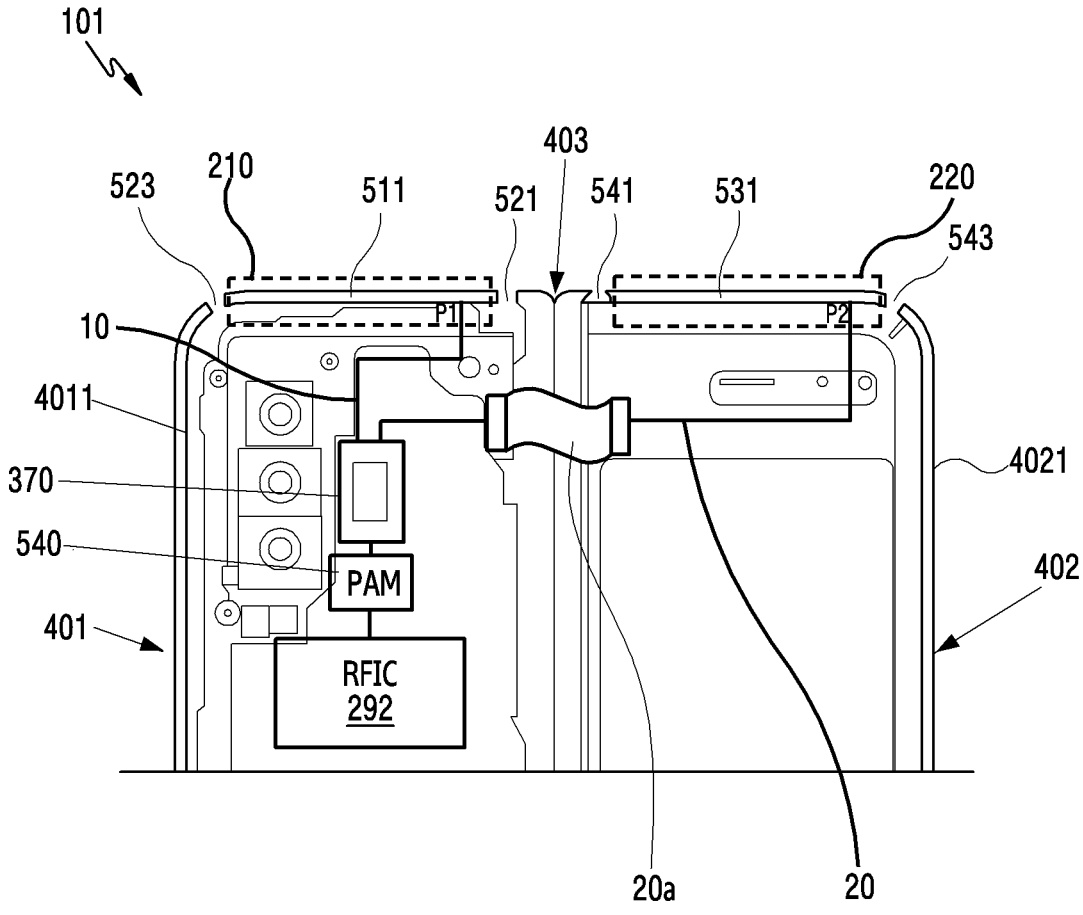
FIG. 7C illustrates an electronic device according to an embodiment of the disclosure.

FIG. 7C illustrates another electronic device according to an embodiment of the disclosure.

Redundant descriptions of components of FIG. 7C having the same reference numerals as those described above will be omitted.

Referring to FIG. 7C, in an embodiment of the disclosure, the first portion 511 may be fed with power at the first point P1 via the first path 10 from the RFIC 292 and may operate as the first antenna 210 configured to transmit and/or receive an RF signal of a predetermined band.

In an embodiment of the disclosure, the second portion 531 may be fed with power at the fourth point P4 via the second path 20 from the RFIC 292 and may operate as the second antenna 220 configured to transmit and/or receive an RF signal of a predetermined band.

In an embodiment of the disclosure, when viewed from above the rear surface of the first part 401, a short-end of the first portion 511 (the end of the first portion 511 close to the first point P1) and an open-end of the second portion 531 (the end of the second portion 531 far from the fourth point P4) may overlap each other and may face the same direction (e.g., a direction toward the connecting portion 403) in the state in which the electronic device 101 is folded.

In an embodiment of the disclosure, when viewed from above the rear surface of the first part 401, an open-end of the first portion 511 (the end of the first portion 511 far from the first point P1) and a short-end of the second portion 531 (the end of the second portion 531 close to the fourth point P4) may overlap each other and may face the same direction (e.g., a direction from the connecting portion 403 toward the outside of the electronic device 101) in the state in which the electronic device 101 is folded.

In an embodiment of the disclosure, the first point P1 of the first portion 511 may be disposed closer to the first split portion 521 than the second split portion 523 in the first portion 511, and the fourth point P4 of the second portion 531 may be disposed closer to the fourth split portion 543 than the third split portion 541 in the second portion 531.

In an embodiment of the disclosure, the phase of the first signal fed to the first antenna 210 and the phase of the second signal fed to the second antenna 220 may be adjusted such that the first antenna 210 including the first portion 511 and the second antenna 220 including the second portion 531 can operate in the antenna mode. For example, the phase of the first signal fed to the first point P1 and the phase of the second signal fed to the fourth point P4 may be out of phase.

In an embodiment of the disclosure, the first antenna 210 including the first portion 511 and the second antenna 220 including the second portion 531 may be configured to transmit and/or receive signals of substantially the same frequency band. The first signal radiated via the first antenna 210 and the second signal radiated via the second antenna 220 may transmit substantially the same data.

Figure 8:
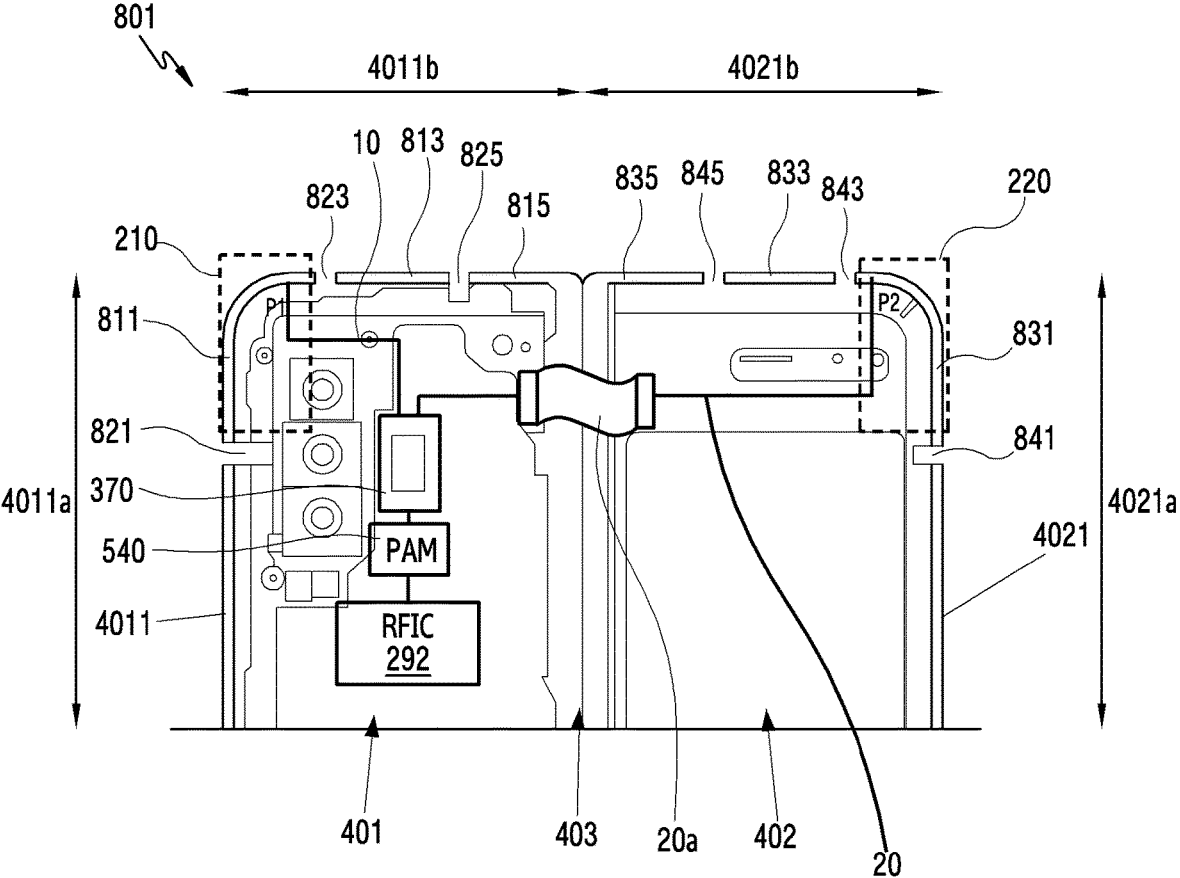
FIG. 8 illustrates an electronic device according to an embodiment of the disclosure.

FIG. 8 illustrates an electronic device according to an embodiment of the disclosure.

Redundant descriptions of components of FIG. 8 having the same reference numerals as those described above will be omitted.

Referring to FIG. 8, a first portion 811 of the first side surface member 4011 of an electronic device 801 according to an embodiment may define a portion of an edge of the first side surface member 4011. For example, the first portion 811 may extend from the first edge 4011*a* of the first side surface member 4011 to the second edge 4011*b* in a direction substantially perpendicular to the first edge 4011*a*. The first portion 811 defines a portion of the first edge 4011*a*, a corner where the first edge 4011*a* and the second edge 4011*b* meet, and a portion of the second edge 4011*b*. The corner connecting the first edge 4011*a* and the second edge 4011*b* may include a curved surface.

In an embodiment of the disclosure, the first portion 811 may be fed with power at the first point P1 via the first path 10 from the RFIC 292 and may operate as the first antenna 210 configured to transmit and/or receive an RF signal of a predetermined band. In an embodiment of the disclosure, the first antenna 210 may include a ground portion (not illustrated), and the ground portion may be electrically connected to a ground. For example, the first portion 811 may be electrically connected to the ground included in the electronic device 801 at a point of the first portion 811. For example, the first antenna 210 may operate as a monopole antenna, an inverted F antenna (IFA), or a loop antenna.

In an embodiment of the disclosure, a first split portion 821 may be provided at one end of the first portion 811 and a second split portion 823 may be provided at the other end of the first portion 811. The first split portion 821 and the second split portion 823 may electrically separate the first portion 811 made of a conductive material from other portions (e.g., a second portion 813) of the first side surface member 4011.

In an embodiment of the disclosure, the second portion 813 of the first side surface member 4011 may define another portion of the first edge 4011*a*. In an embodiment of the disclosure, the second portion 813 may be spaced apart from the first portion 811 with the second split portion 823 interposed therebetween and may extend from the second split portion 823 to a third split portion 825.

In an embodiment of the disclosure, a third portion 815 of the first side surface member 4011 may be spaced apart from the second portion 813 with the third split portion 825 interposed therebetween. The third portion 815 may extend from the third split portion 825 to the connecting portion 403.

In an embodiment of the disclosure, the first portion 811, the second portion 813, and/or the third portion 815 of the first side surface member 4011 may include a conductive material.

In an embodiment of the disclosure, the second portion 813 and/or the third portion 815 of the first side surface member 4011 may be fed with power from the RFIC 292 and may operate as other antenna radiators distinct from the first antenna 210.

In an embodiment of the disclosure, a second split portion 823 may be provided at one end of the second portion 813 and a third split portion 825 may be provided at the other end of the second portion 813. The second split portion 823 and the third split portion 825 may electrically separate the second portion 813 from other portions of the first side surface member 4011.

In an embodiment of the disclosure, the first split portion 821, the second split portion 823, and/or the third split portion 825 may include a material having a predetermined permittivity or a non-conductive material (e.g., air or resin).

In an embodiment of the disclosure, a fourth portion 831 of the second side surface member 4021 may define a portion of an edge of the second side surface member 4021. For example, the fourth portion 831 may extend from the third edge 4021*a* of the second side surface member 4021 to the fourth edge 4021*b* by extending in a direction substantially perpendicular to the third edge 4021*a*, which extends from the connecting portion 403 in a direction substantially perpendicular to the connecting portion 403. The fourth portion 831 may define a portion of the third edge 4021*a* of the second side surface member 4021, a corner where the third edge 4021*a* and the fourth edge 4021*b* meet, and a portion of the fourth edge 4021*b*. The corner of the second side surface member 4021 connecting the third edge 4021*a* and the fourth edge 4021*b* may include a curved surface.

In an embodiment of the disclosure, the fourth portion 831 may be fed with power at the second point P2 via the second path 20 from the RFIC 292 and may operate as the second antenna 220 configured to transmit and/or receive an RF signal of a predetermined band.

In an embodiment of the disclosure, a fourth split portion 841 may be provided at one end of the fourth portion 831 and a fifth split portion 843 may be provided at the other end of the fourth portion 831. The fourth split portion 841 and the fifth split portion 843 may electrically separate the fourth portion 831 made of a conductive material from other portions (e.g., a fifth portion 833) of the second side surface member 4021.

In an embodiment of the disclosure, the fifth portion 833 of the second side surface member 4021 may define another portion of the third edge 4021*a*. In an embodiment of the disclosure, the fifth portion 833 may be spaced apart from the fourth portion 831 with the fifth split portion 843 interposed therebetween and may extend from the fifth split portion 843 to a sixth split portion 845.

In an embodiment of the disclosure, a sixth portion 835 of the second side surface member 4021 may be spaced apart from the fifth portion 833 with the sixth split portion 845 interposed therebetween. The sixth portion 835 may extend from the sixth split portion 845 to the connecting portion 403.

In an embodiment of the disclosure, the fourth portion 831, the fifth portion 833, and/or the sixth portion 835 of the second side surface member 4021 may include a conductive material.

In an embodiment of the disclosure, the fifth portion 833 and/or the sixth portion 835 of the second side surface member 4021 may be fed with power from the RFIC 292 and may operate as other antenna radiators distinct from the second antenna 220.

In an embodiment of the disclosure, a fifth split portion 843 may be provided at one end of the fifth portion 833 of the second side surface member 4021 and a sixth split portion 845 may be provided at the other end of the fifth portion 833. The fifth split portion 843 and the sixth split portion 845 may electrically separate the fifth portion 833 from other portions of the second side surface member 4021.

In an embodiment of the disclosure, the fourth split portion 841, the fifth split portion 843, and/or the sixth split portion 845 may include a material having a predetermined permittivity or a non-conductive material (e.g., air or resin).

In an embodiment of the disclosure, the first portion 811 of the first side surface member 4011 and the fourth portion 831 of the second side surface member 4021 may correspond to each other. For example, in the state in which the electronic device 801 is unfolded, the first portion 811 and the fourth portion 831 may be disposed at symmetrical positions of the first part 401 and the second part 402. For example, when viewed from above the rear surface of the first part 401, the first portion 811 and the fourth portion 831 may overlap each other in the state in which the electronic device 801 is folded.

In an embodiment of the disclosure, when viewed from above the rear surface of the first part 401, a short-end of the first portion 811 (the end of the first portion 811 close to the first point P1 or the end of the first portion 811 adjacent to the second split portion 823) and a short-end of the fourth portion 831 (the end of the fourth portion 831 close to the second point P2 or the end of the fourth portion 831 adjacent to the fifth split portion 843) may overlap each other in the state in which the electronic device 801 is folded.

In an embodiment of the disclosure, when viewed from above the rear surface of the first part 401, an open-end of the first portion 811 (the end of the first portion 811 far from the first point P1 or the end of the first portion 811 adjacent to the first split portion 821) and an open-end of the fourth portion 831 (the end of the fourth portion 831 far from the second point P2 or the end of the fourth portion 831 adjacent to the fourth split portion 841) may overlap each other in the state in which the electronic device 801 is folded.

In an embodiment of the disclosure, the first point P1 of the first portion 811 and the second point P2 of the fourth portion 831 may correspond to each other. For example, when viewed from above the rear surface of the first part 401 in the state in which the electronic device 801 is folded, the first point P1 of the first portion 811 may substantially overlap the second point P2 of the fourth portion 831. As another example, even when the first point P1 and the second point P2 do not overlap in the state in which the electronic device 801 is folded, the first point P1 and/or the second point P2 may be closer to the connecting portion 403 than the outside of the electronic device 801.

In an embodiment of the disclosure, in order to suppress the electronic device 801 from operating in the transmission line mode and make the electronic device 801 operate in the antenna mode, the phase shifter 370 may be configured to adjust the phase of the first signal provided to the first portion 811 via the first path 10 and the phase of the second signal provided to the fourth portion 831 via the second path 20. The electronic device 801 according to an embodiment is capable of maintaining or improving radiation efficiency of the first antenna 210 and/or the second antenna 220 by operating in the antenna mode in the folded state. As for the method for controlling the phases of signals provided to the first antenna 210 and the second antenna 220 such that the electronic device 801 according to an embodiment operates in the antenna mode, the descriptions provided with reference to FIG. 5 may be applied in the same, similar, or corresponding manner.

Figure 9:
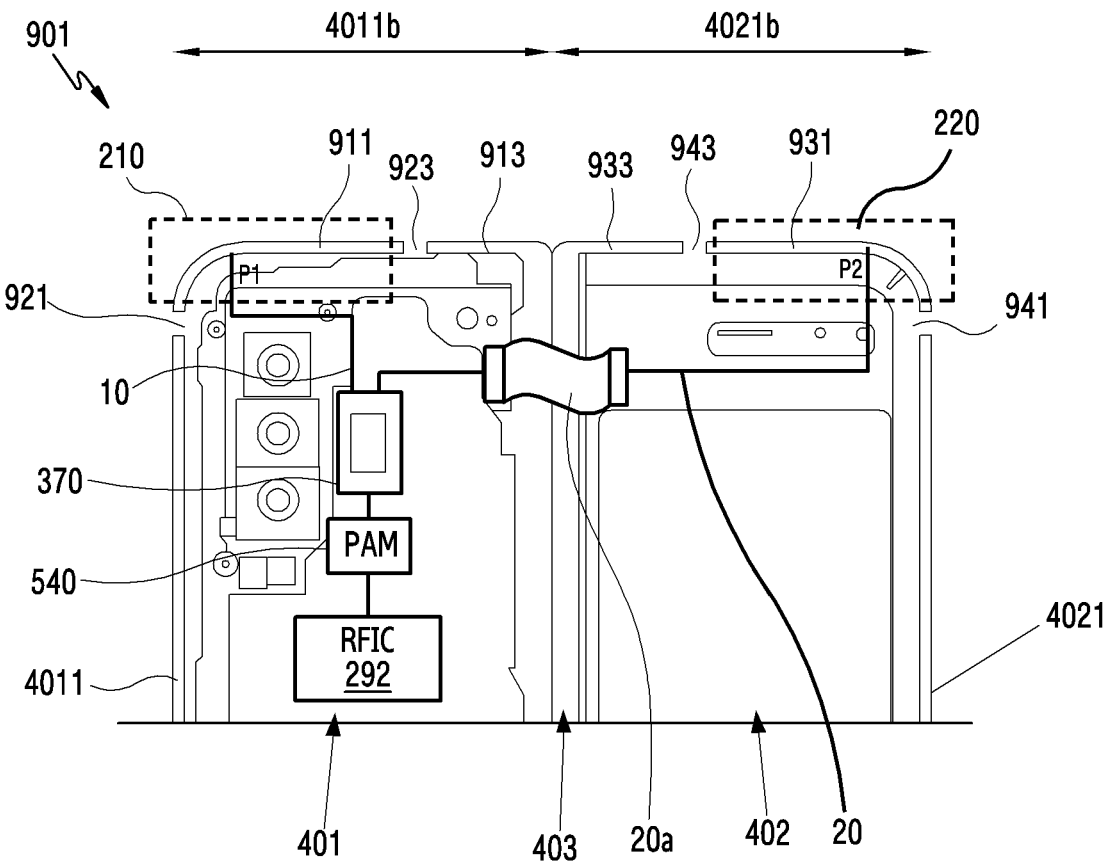
FIG. 9 illustrates an electronic device according to an embodiment of the disclosure.

FIG. 9 illustrates an electronic device according to an embodiment of the disclosure.

Redundant descriptions of components of FIG. 9 having the same reference numerals as those described above will be omitted.

FIG. 9 is different from FIG. 8 only in the split structures of the upper edges of the first part 401 and the second part 402. For example, the positions and shapes of a first portion 911 included in the first antenna 210 and a third portion 931 included in the second antenna 220 may be changed.

Unlike the second edge 4011*b* of the first part 401 (or the first side surface member 4011) of the electronic device 801 of FIG. 8 that includes the first portion 811, the second split portion 823, the second portion 813, the third split portion 825, and the third portion 815, the second edge 4011*b* of the first part 401 (or the first side surface member 4011) of an electronic device 901 of FIG. 9 may include a first portion 911, a second split portion 923, and a second portion 913.

Unlike the fourth edge 4021*b* of the second part 402 (or the second side surface member 4021) of the electronic device 801 of FIG. 8 that includes the fourth portion 831, the fifth split portion 843, the fifth portion 833, the sixth split portion 845, and the sixth portion 835, the fourth edge 4021*b* of the second part 402 (or the second side surface member 4021) of the electronic device 901 of FIG. 9 may include a third portion 931, a fourth split portion 943, and a fourth portion 933.

In an embodiment of the disclosure, at opposite ends of the first portion 911 of the first side surface member 4011, a first split portion 921 and a second split portion 923 may be provided to separate the first portion 911 from other portions of the first side surface member 4011.

In an embodiment of the disclosure, the second portion 913 may be spaced apart from the first portion 911 with the second split portion 923 interposed therebetween. For example, the second portion 913 may be electrically separated from the first portion 911. The second portion 913 may extend from the second split portion 923 to the connecting portion 403.

In an embodiment of the disclosure, at opposite ends of the third portion 931 of the second side surface member 4021, a third split portion 941 and a fourth split portion 943 may be provided to separate the third portion 931 from other portions of the second side surface member 4021.

In an embodiment of the disclosure, the fourth portion 933 may be spaced apart from the third portion 931 with the fourth split portion 943 interposed therebetween. For example, the fourth portion 933 may be electrically separated from the third portion 931. The fourth portion 933 may extend from the fourth split portion 943 to the connecting portion 403.

In an embodiment of the disclosure, the first portion 911, the second portion 913, the third portion 931, and/or the fourth portion 933 may include a conductive material.

In an embodiment of the disclosure, the first split portion 921, the second split portion 923, the third split portion 941, and/or the fourth split portion 943 may be filled with air or a non-conductive material such as resin.

In an embodiment of the disclosure, the first portion 911 of the first side surface member 4011 may be fed with power at the first point P1 from the RFIC 292 via the first path 10 and may operate as the first antenna 210. In an embodiment of the disclosure, the second portion 913 electrically separated from the first portion 911 may operate as another antenna radiator distinct from the first antenna 210 by being fed with power by the RFIC 292.

In an embodiment of the disclosure, the third portion 931 of the second side surface member 4021 may be fed with power at the second point P2 from the RFIC 292 via the second path 20 and may operate as the second antenna 220. In an embodiment of the disclosure, the fourth portion 933 electrically separated from the third portion 931 may operate as another antenna radiator distinct from the second antenna 220 by being fed with power by the RFIC 292.

In an embodiment of the disclosure, when viewed from above the rear surface of the first part 401, the first point P1 may overlap the second point P2.

As for the electronic device 901 of FIG. 9, the descriptions of the electronic device 801 provided with reference to FIG. 8 may be applied in the same, similar, or corresponding manner.

Figure 10:
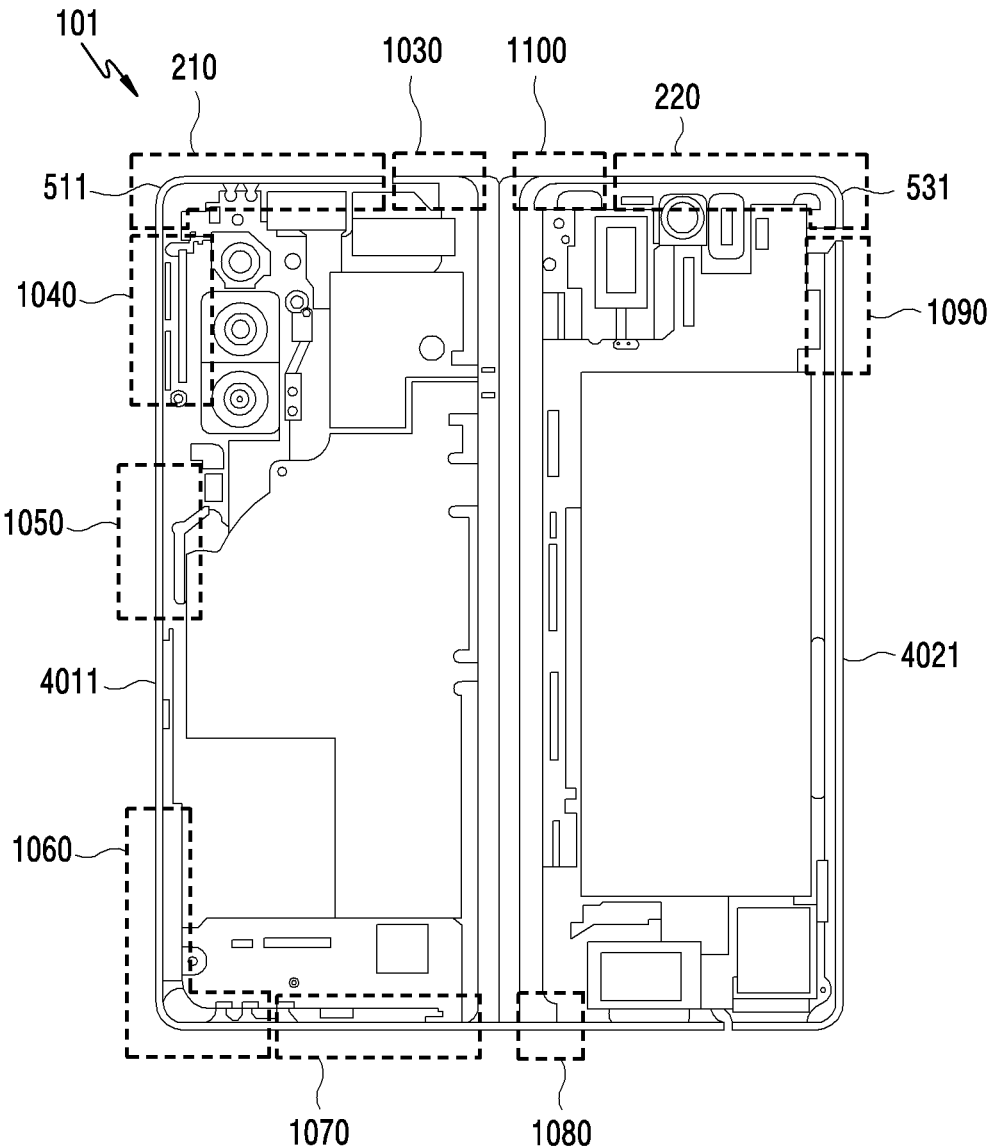
FIG. 10 illustrates an electronic device including a plurality of antennas according to an embodiment of the disclosure.

FIG. 10 illustrates an electronic device including a plurality of antennas according to an embodiment of the disclosure.

Redundant descriptions of components of FIG. 10 having the same reference numerals as those described above will be omitted.

Referring to FIG. 10, an electronic device 101 according to an embodiment may include a third antenna 1030, a fourth antenna 1040, a fifth antenna 1050, a sixth antenna 1060, a seventh antenna 1070, an eighth antenna 1080, a ninth antenna 1090, and/or a tenth antenna 1100.

In an embodiment of the disclosure, the first antenna 210, the third antenna 1030, the fourth antenna 1040, the fifth antenna 1050, the sixth antenna 1060, and/or the seventh antenna 1070 may be disposed along the periphery of the first side surface member 4011 and may include a portion of the first side surface member 4011 as an antenna radiator.

In an embodiment of the disclosure, the first antenna 210 may be configured to transmit and/or receive an RF signal corresponding to a first predetermined frequency band. For example, the first predetermined frequency band may include a low band (LB) (about 600 to 1 GHz). As another example, the first antenna 210, the third antenna 1030, the fourth antenna 1040, the fifth antenna 1050, the sixth antenna 1060, and/or the seventh antenna 1070 may be configured with a conductive pattern disposed inside the first part 401 without including a portion of the first side surface member 4011 as a radiator.

In an embodiment of the disclosure, the first antenna 210 may include a ground portion (not illustrated), and the ground portion may be electrically connected to a ground. For example, the first portion 511 may be electrically connected to the ground included in the electronic device 101 at a point of the first portion 511. For example, the first antenna 210 may operate as a monopole antenna, an inverted F antenna (IFA), or a loop antenna.

In an embodiment of the disclosure, the third antenna 1030 may be configured to transmit and/or receive an RF signal corresponding to a third predetermined frequency band. For example, the third predetermined frequency band may include at least one of a frequency band for global positioning system (GPS) communication (e.g., 1575.42 MHz or 1227.60 MHz), a middle band (MB) (about 1 to 2.2 GHz), a high band (HB) (about 2.2 to 2.7 GHz), and/or an ultra-high band (UHB) (about 2.7 to 3.6 GHz).

In an embodiment of the disclosure, the fourth antenna 1040 may be configured to transmit and/or receive an RF signal corresponding to a fourth predetermined frequency band. For example, the fourth predetermined frequency band may include the UHB.

In an embodiment of the disclosure, the fifth antenna 1050 may be configured to transmit and/or receive an RF signal corresponding to a fifth predetermined frequency band. For example, the fifth predetermined frequency band may include the UHB.

In an embodiment of the disclosure, the sixth antenna 1060 may be configured to transmit and/or receive an RF signal corresponding to a sixth predetermined frequency band. For example, the sixth predetermined frequency band may include at least one of the LB, MB, and/or HB.

In an embodiment of the disclosure, the seventh antenna 1070 may be configured to transmit and/or receive an RF signal corresponding to a seventh predetermined frequency band. For example, the seventh predetermined frequency band may include at least one of the MB, HB, and/or UHB.

In an embodiment of the disclosure, the second antenna 220, the eighth antenna 1080, the ninth antenna 1090, and/or the tenth antenna 1100 may be disposed along the periphery of the second side surface member 4021 and may include a portion of the second side surface member 4021 as an antenna radiator. As another example, the second antenna 220, the eighth antenna 1080, the ninth antenna 1090, and/or the tenth antenna 1100 may be configured with a conductive pattern disposed inside the second part 402 without including a portion of the second side surface member 4021 as a radiator.

In an embodiment of the disclosure, the second antenna 220 may be configured to transmit and/or receive an RF signal corresponding to a second predetermined frequency band. For example, the second predetermined frequency band may include the LB.

In an embodiment of the disclosure, the eighth antenna 1080 may be configured to transmit and/or receive an RF signal corresponding to an eighth predetermined frequency band. For example, the eighth predetermined frequency band may include at least one of the MB and/or HB.

In an embodiment of the disclosure, the ninth antenna 1090 may be configured to transmit and/or receive an RF signal corresponding to a ninth predetermined frequency band. For example, the ninth predetermined frequency band may include a frequency band for Wi-Fi communication (e.g., 2.4 GHz or 5 GHz).

In an embodiment of the disclosure, the tenth antenna 1100 may be configured to transmit and/or receive an RF signal corresponding to a tenth predetermined frequency band. For example, the tenth predetermined frequency band may include a frequency band for Wi-Fi communication.

In an embodiment of the disclosure, at least two of the first antenna 210, the second antenna 220, the third antenna 1030, the fourth antenna 1040, the fifth antenna 1050, the sixth antenna 1060, the seventh antenna 1070, the eighth antenna 1080, the ninth antenna 1090, and tenth antenna 1100 may be operated as antennas for multiple input multiple output (MIMO) communication. For example, the ninth antenna 1090 and the tenth antenna 1100 for Wi-Fi communication may be operated as 2×2 MIMO antennas.

Figure 11A:
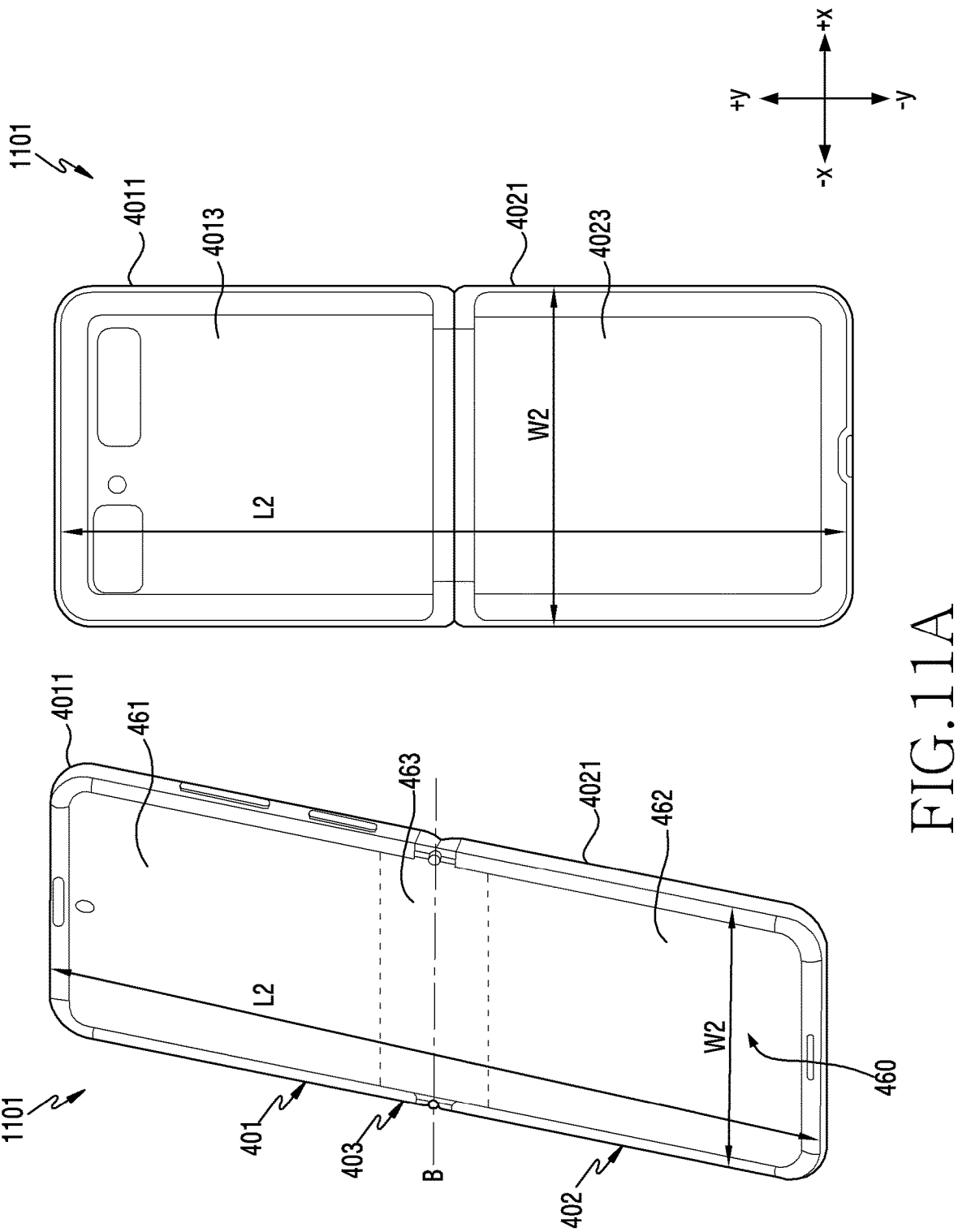
FIG. 11A illustrates an electronic device in an unfolded state according to an embodiment of the disclosure.

FIG. 11A illustrates an electronic device in an unfolded state according to an embodiment of the disclosure.

Figure 11B:
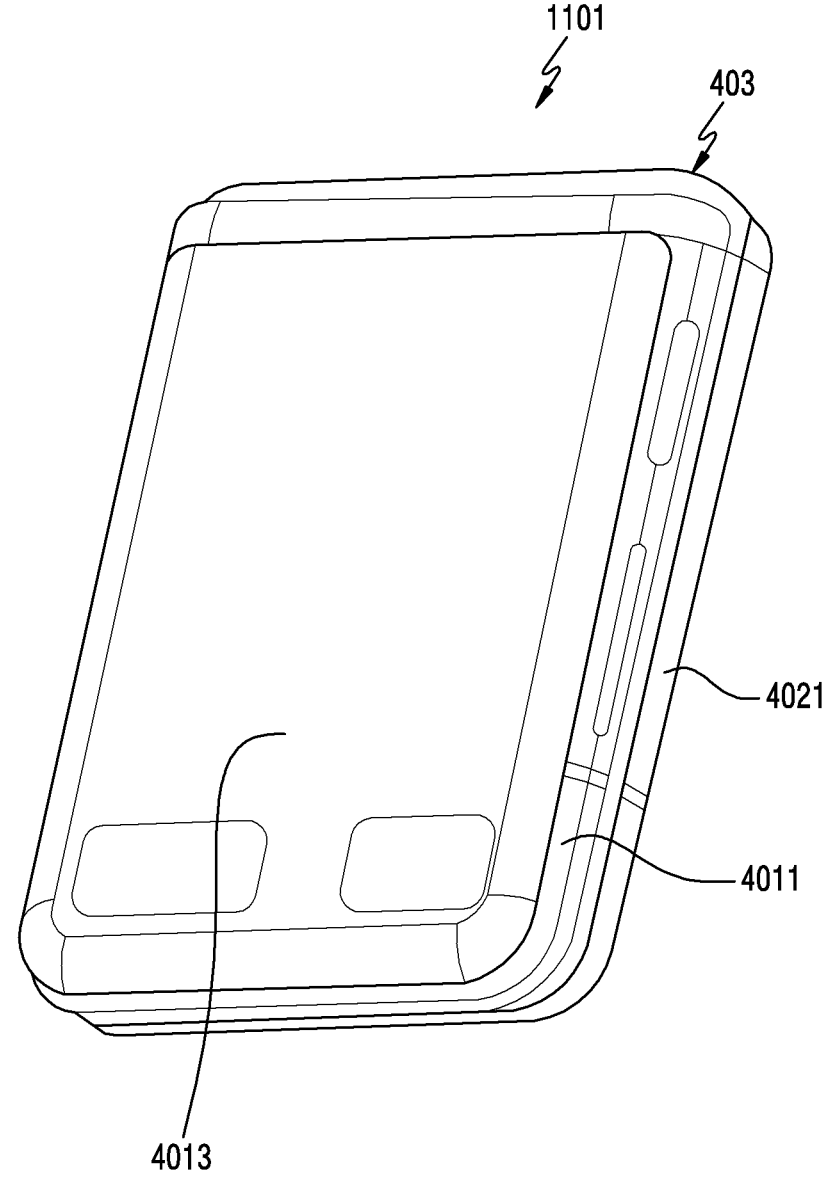
FIG. 11B illustrates an electronic device in a folded state according to an embodiment of the disclosure.

FIG. 11B illustrates the electronic device in a folded state according to an embodiment of the disclosure.

Redundant descriptions of components of FIGS. 11A and 11B having the same reference numerals as those described above will be omitted.

In an embodiment of the disclosure, in the unfolded state of FIG. 11A, the electronic device 1101 may have a substantially rectangular shape. For example, the electronic device 1101 may have a predetermined width W2 and a predetermined length L2 longer than the predetermined width W2. As another example, the electronic device 1101 may have a predetermined width W2 and a predetermined length L2 that is substantially equal to or shorter than the predetermined width W1. Unlike the electronic device 101 of FIG. 4A, the electronic device 1101 may be folded or unfolded about a folding axis B that is substantially parallel to the short edges of the rectangular shape (e.g., the edges oriented in the x-axis direction among edges of the electronic device 1101 of FIG. 11A).

Figure 12:
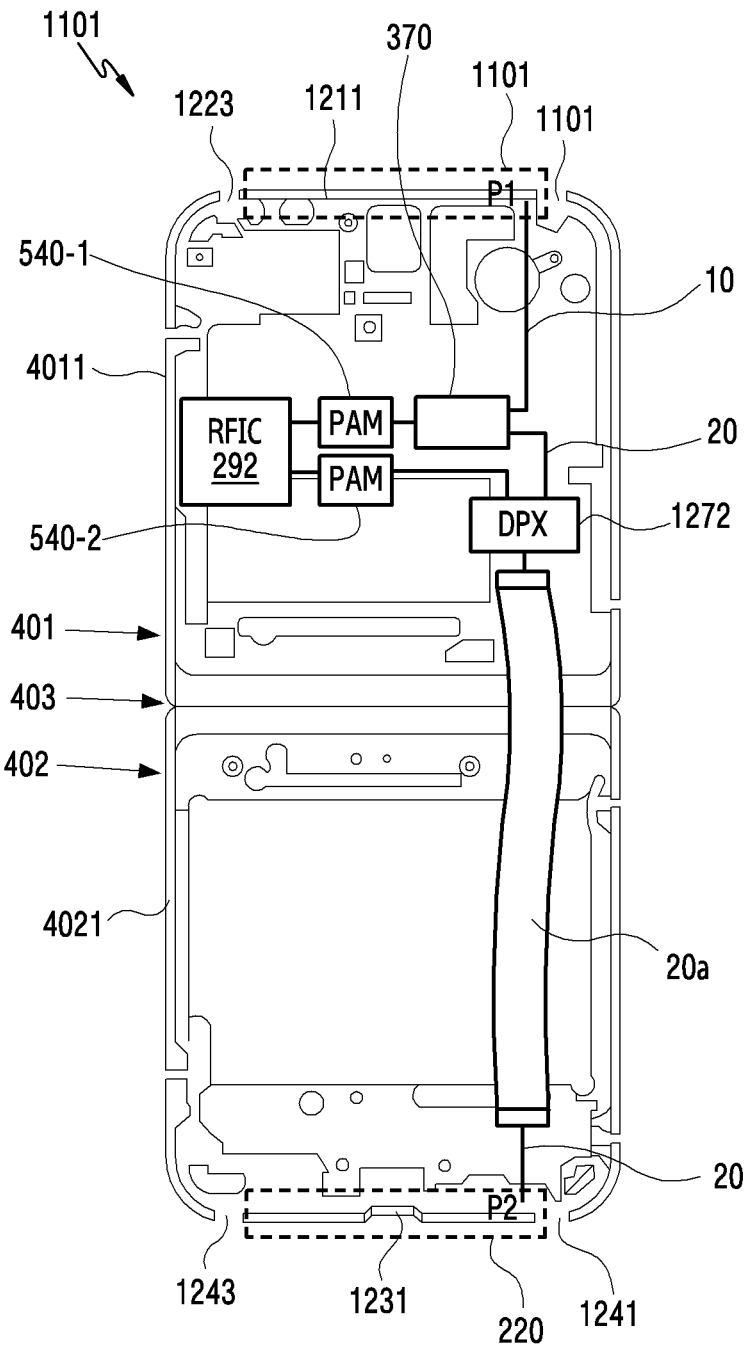
FIG. 12 illustrates an electronic device according to an embodiment of the disclosure.

FIG. 12 illustrates an electronic device according to an embodiment of the disclosure.

Redundant descriptions of components of FIG. 12 having the same reference numerals as those described above will be omitted.

Referring to FIG. 12, a first portion 1211 of the first side surface member 4011 may define a portion of an edge of the first side surface member 4011. For example, the first portion 1211 may be located at the farthest edge from the connecting portion 403 among the edges of the first side surface member 4011. In an embodiment of the disclosure, the first portion 1211 may be substantially parallel to the connecting portion 403.

In an embodiment of the disclosure, the first portion 1211 may be fed with power at the first point P1 via the first path 10 from the RFIC 292 and may operate as the first antenna 210 configured to transmit and/or receive an RF signal of a predetermined band. In an embodiment of the disclosure, the first portion 1211 may include a conductive material.

In an embodiment of the disclosure, a first split portion 1221 may be provided at one end of the first portion 1211 and a second split portion 1223 may be provided at the other end of the first portion 1211. The first split portion 1221 and the second split portion 1223 may electrically separate the first portion 1211 from other portions of the first side surface member 4011. In an embodiment of the disclosure, the first split portion 1221 and/or the second split portion 1223 may include a material having a predetermined permittivity or a non-conductive material (e.g., air or resin).

In an embodiment of the disclosure, a second portion 1231 of the second side surface member 4021 may define a portion of an edge of the second side surface member 4021. For example, the second portion 1231 may be located at the farthest edge from the connecting portion 403 among the edges of the second side surface member 4021.

In an embodiment of the disclosure, the second portion 1231 may be fed with power at the second point P2 via the second path 20 from the RFIC 292 and may operate as the second antenna 220 configured to transmit and/or receive an RF signal of a predetermined band. In an embodiment of the disclosure, the second portion 1231 may include a conductive material. In an embodiment of the disclosure, the second path 20 may include a flexible printed circuit board RF cable (FRC) 20a crossing the connecting portion 403. In an example, the FRC 20a may be configured as a separate F-PCB and disposed between PCBs.

In an embodiment of the disclosure, a third split portion 1241 may be provided at one end of the second portion 1231 and a fourth split portion 1243 may be provided at the other end of the second portion 1231. The third split portion 1241 and the fourth split portion 1243 may electrically separate the second portion 1231 made of a conductive material from other portions of the second side surface member 4021. In an embodiment of the disclosure, the third split portion 1241 and/or the fourth split portion 1243 may include a material having a predetermined permittivity or a non-conductive material (e.g., air or resin).

The electronic device 101 according to an embodiment may include PAMs 540-1 and 540-2 and a duplexer 1272. In an embodiment of the disclosure, a first PAM 540-1 may be disposed on an electrical path between the phase shifter 370 and the RFIC 292. In an embodiment of the disclosure, a second PAM 540-2 may be disposed on an electrical path between the duplexer 1272 and the RFIC 292. In an embodiment of the disclosure, the PAMs 540-1 and 540-2 may be configured to amplify signals provided from the RFIC 292. In an embodiment of the disclosure, the duplexer 1272 may include a filter circuit configured to selectively pass the signals provided from the first PAM 540-1 or the signals provided from the second PAM 540-2.

In an embodiment of the disclosure, the first portion 1211 and the second portion 1231 may correspond to each other. For example, the first portion 1211 and the second portion 1231 may be disposed at edges facing each other among the edges of the electronic device 1101 in the state in which the electronic device 1101 is unfolded. As another example, when viewed from above the rear surface of the first part 401, the first portion 1211 and the second portion 1231 may overlap each other in the state in which the electronic device 1101 is folded.

In an embodiment of the disclosure, when viewed from above the rear surface of the first part 401, a short-end of the first portion 1211 (the end of the first portion 1211 close to the first point P1) and a short-end of the second portion 1231 (the end of the second portion 1231 close to the second point P2) may overlap each other in the state in which the electronic device 1101 is folded.

In an embodiment of the disclosure, when viewed from above the rear surface of the first part 401, an open-end of the first portion 1211 (the end of the first portion 1211 far from the first point P1) and an open-end of the second portion 1231 (the end of the second portion 1231 far from the second point P2) may overlap each other in the state in which the electronic device 1101 is folded.

In an embodiment of the disclosure, the first point P1 of the first portion 1211 and the second point P2 of the second portion 1231 may correspond to each other. For example, when viewed from above the rear surface of the first part 401 in the state in which the electronic device 1101 is folded, the first point P1 of the first portion 1211 may overlap the second point P2 of the second portion 1231. As another example, even if the first point P1 and the second point P2 do not overlap in the state in which the electronic device 1101 is folded, the first point P1 and/or the second point P2 may be arranged to be biased to the same side of the first portion 1211 and the second portion 1231 (e.g., the right in the illustration of FIG. 12).

In an embodiment of the disclosure, in order to make the electronic device 1101 operate in the antenna mode, the phase shifter 370 may be configured to adjust the phase of the first signal provided to the first portion 1211 via the first path 10 and the phase of the second signal provided to the second portion 1231 via the second path 20.

For example, in the case of the J4 mode, the electronic device 1101 according to an embodiment may be configured to adjust a first signal provided to the first portion 1211 and a second signal provided to the second portion 1231 to be in phase in the state in which the electronic device 1101 is folded about the folding axis B.

As another example, in the state in which the electronic device 1101 is unfolded, the electronic device 1101 may prevent operation in the array antenna mode by using a switch (e.g., the first switch 232 in FIG. 2) located on an electrical path between the phase shifter 370 or the RFIC 292 and the first portion 1211 or the second portion 1231.

Figure 13:
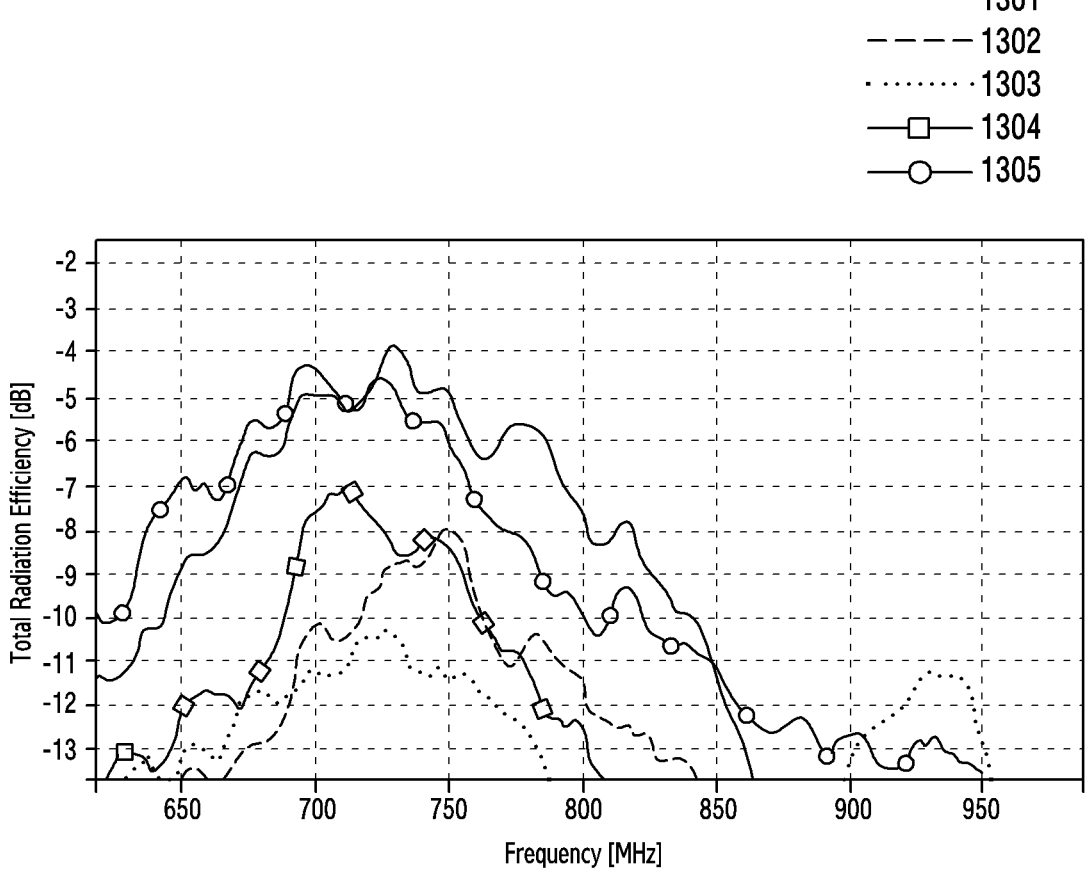
FIG. 13 is a graph showing radiation efficiencies of a first antenna and a second antenna according to an embodiment of the disclosure.

FIG. 13 is a graph showing radiation efficiencies of the first antenna and the second antenna according to an embodiment of the disclosure.

Reference numeral 1301 in FIG. 13 indicates antenna radiation efficiency when the first antenna 210 and the second antenna 220 operate in the basic mode in the state in which the electronic device 1101 is unfolded.

Reference numeral 1302 in FIG. 13 indicates antenna radiation efficiency when the first antenna 210 and the second antenna 220 operate in the basic mode in the state in which the electronic device 1101 is folded.

Reference numeral 1303 in FIG. 13 indicates antenna radiation efficiency when the first antenna 210 and the second antenna 220 operate in the array antenna mode in the state in which the electronic device 1101 is unfolded. Reference numeral 1303 may indicate antenna radiation efficiency when the electronic device 1101 according to an embodiment provides signals that are in phase to the first portion 1211 and the second portion 1231 in the unfolded state.

Reference numeral 1304 in FIG. 13 indicates antenna radiation efficiency when the first antenna 210 and the second antenna 220 operate in the array antenna mode in the state in which the electronic device 1101 is folded. Reference numeral 1304 may indicate antenna radiation efficiency when the electronic device 1101 according to an embodiment provides signals that are in phase to the first portion 1211 and the second portion 1231 in the folded state.

Reference numeral 1305 in FIG. 13 indicates antenna radiation efficiency when the first antenna 210 and the second antenna 220 operate in the array antenna mode in the state in which the electronic device 1101 is unfolded. Reference numeral 1305 may indicate antenna radiation efficiency when the electronic device 1101 according to an embodiment provides signals that are out of phase to the first portion 1211 and the second portion 1231 in the unfolded state.

The electronic device 1101 according to an embodiment may adjust the phases of the signals provided to the first antenna 210 and the second antenna 220 to suppress the first ground corresponding to the first part 401 and the second ground corresponding to the second part 402 and to make the first ground and the second ground operate in the antenna mode in the state in which the electronic device is folded, thereby maintaining or improving the radiation efficiencies of the first antenna 210 and the second antenna 220. For example, referring to FIG. 13, in the state in which the electronic device 1101 is folded, in a predetermined frequency band C, the radiation efficiency when operating in the array antenna mode (reference numeral 1304) may be more improved than the radiation efficiency when operating in the basic mode (reference numeral 1302).

Figure 14:
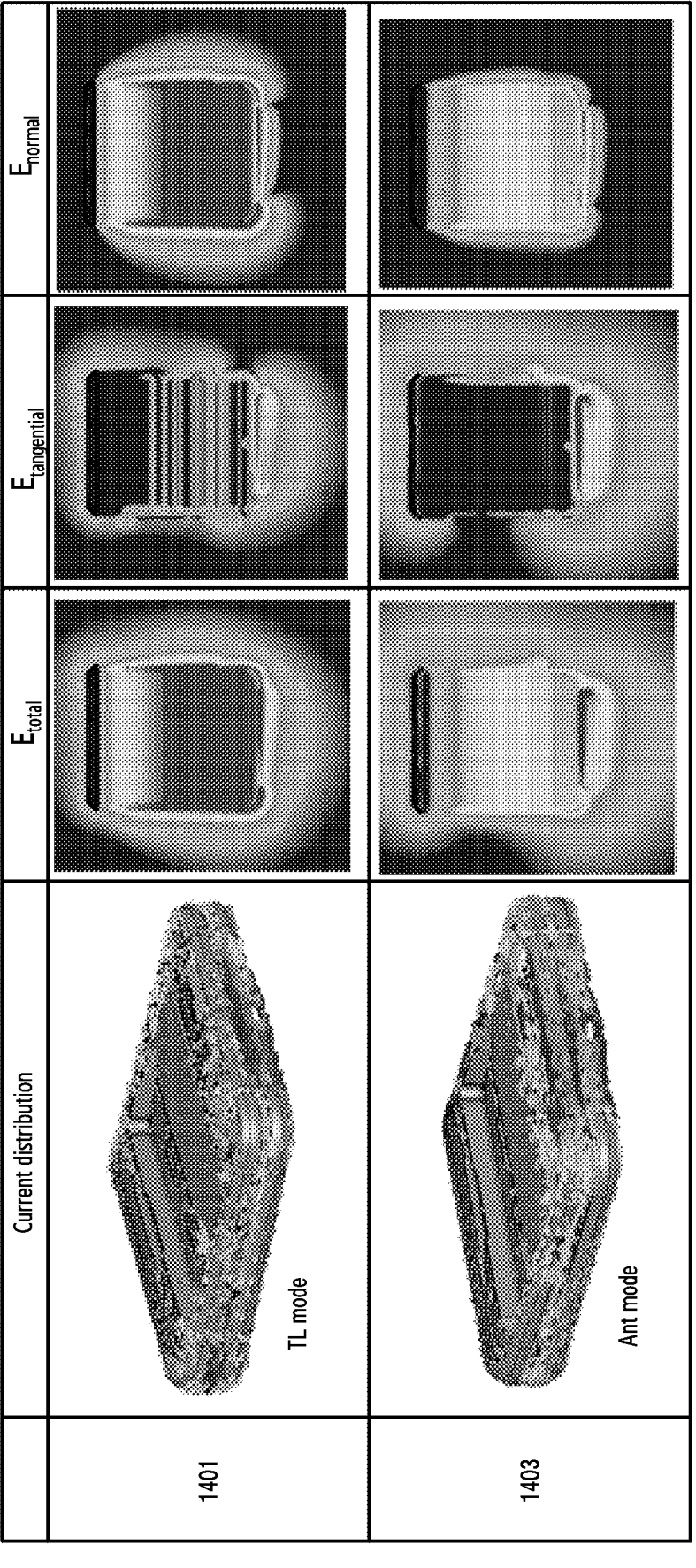
FIG. 14 illustrates current and electric field distributions when an electronic device operates in a transmission line mode or an antenna mode according to an embodiment of the disclosure.

FIG. 14 illustrates current and electric field distributions when the electronic device 1101 operates in the transmission line mode or the antenna mode in the folded state according to an embodiment of the disclosure.

Referring to FIG. 14, in the transmission line mode, the directions of currents flowing in the first part 1401 and the second part 1402 of the electronic device 1101 may be opposite to each other. Unlike the transmission line mode, in the antenna mode, the directions of currents flowing in the first part 1401 and the second part 1402 of the electronic device 1101 may be the same.

In the electronic device 1101 in the transmission line mode, an electric field confined inside ($E_{normal}$) may be more dominant than an externally radiated electric field ($E_{tangential}$).

Compared to the transmission line mode, the electronic device 1101 in the antenna mode may provide an electric field distribution ($E_{total}$) in which the externally radiated electric field ($E_{tangential}$) is increased and the electric field confined inside ($E_{normal}$) is reduced.

Figure 15A:
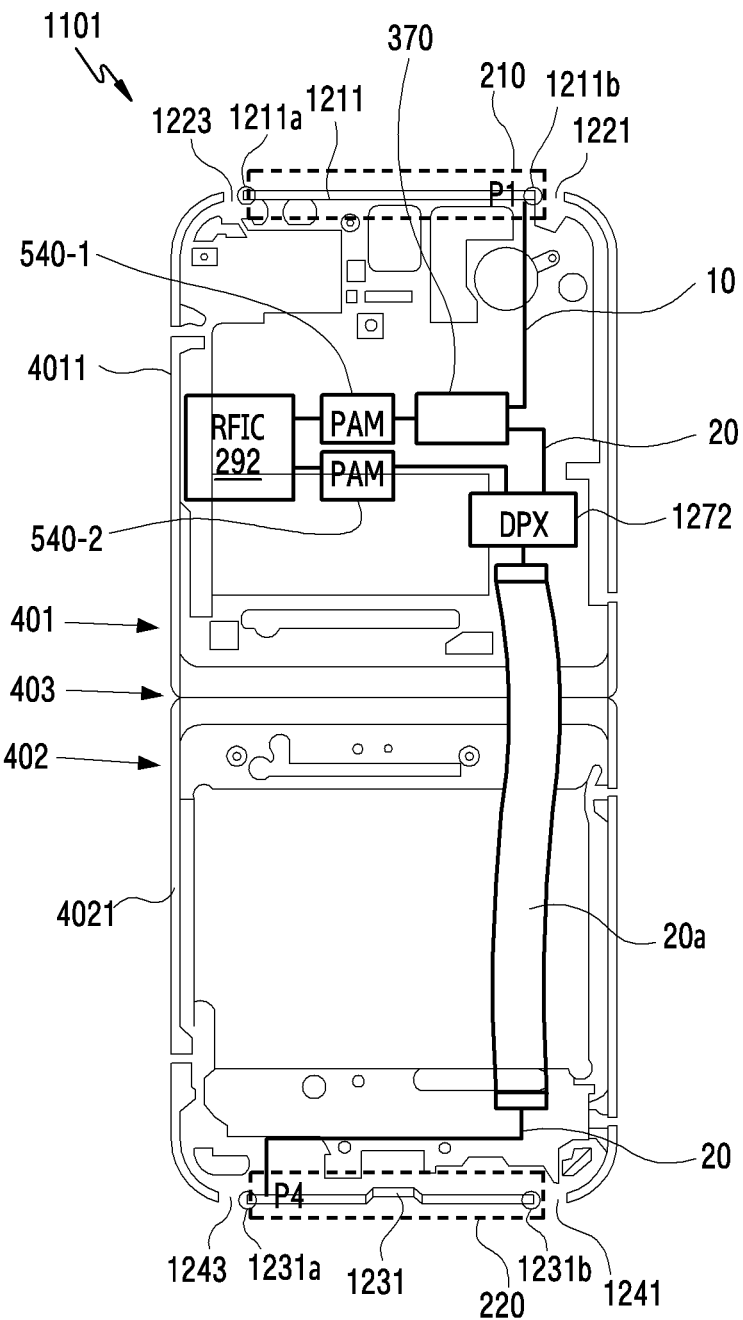
FIG. 15A illustrates an electronic device according to an embodiment of the disclosure.

FIG. 15A illustrates an electronic device according to an embodiment of the disclosure.

Redundant descriptions of components of FIG. 15A having the same reference numerals as those described above will be omitted.

Referring to FIG. 15A, in an embodiment of the disclosure, the second portion 1231 may be fed with power at the fourth point P4 via the second path 20 from the RFIC 292 and may operate as the second antenna 220 configured to transmit and/or receive an RF signal of a predetermined band.

In an embodiment of the disclosure, when viewed from above the rear surface of the first part 401, a short-end of the first portion 1211 (the end of the first portion 1211 close to the first point P1) and an open-end of the second portion 1231 (the end of the second portion 1231 far from the fourth point P4) may overlap each other in the state in which the electronic device 1101 is folded.

In an embodiment of the disclosure, when viewed from above the rear surface of the first part 401, an open-end of the first portion 1211 (the end of the first portion 1211 far from the first point P1) and a short-end of the second portion 1231 (the end of the second portion 1231 close to the fourth point P4) may overlap each other in the state in which the electronic device 1101 is folded.

In an embodiment of the disclosure, in the folded state, the electronic device 1101 may control the phase shifter 370 such that the phase of the first signal fed via the first point P1 of the first portion 1211 and the phase of the second signal fed via the fourth point P4 of the second portion 1231 are out of phase. As another example, in the state in which the electronic device 1101 is unfolded, the first antenna 210 and the second antenna 220 may operate in the basic mode. For example, the first antenna 210 and the second antenna 220 may operate as individual antennas.

Figure 15B:
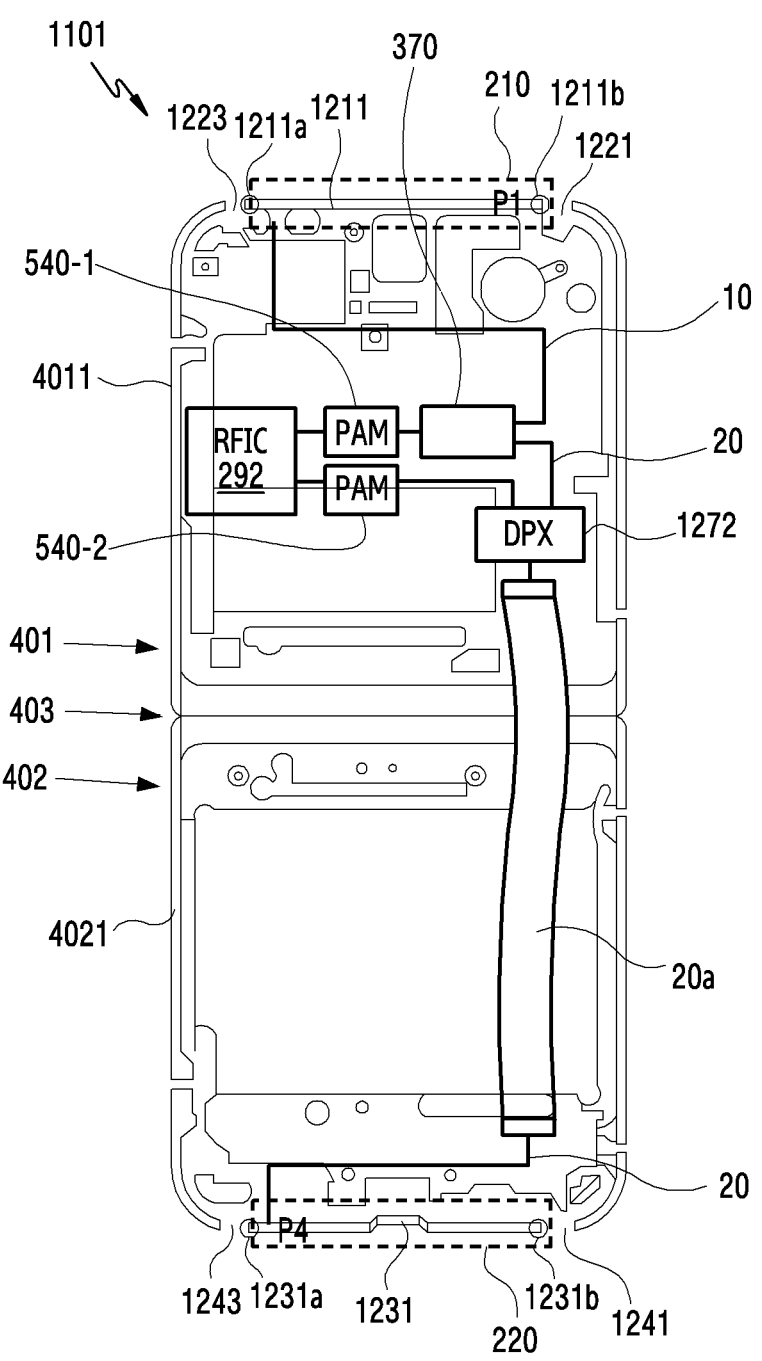
FIG. 15B illustrates an electronic device according to an embodiment of the disclosure.

FIG. 15B illustrates an electronic device according to an embodiment of the disclosure.

Redundant descriptions of components of FIG. 15B having the same reference numerals as those described above will be omitted.

Referring to FIG. 15B, in an embodiment of the disclosure, the first portion 1211 may be fed with power at the third point P3 via the first path 10 from the RFIC 292 and may operate as the first antenna 210 configured to transmit and/or receive an RF signal of a predetermined band.

In an embodiment of the disclosure, the second portion 1231 may be fed with power at the fourth point P4 via the second path 20 from the RFIC 292 and may operate as the second antenna 220 configured to transmit and/or receive an RF signal of a predetermined band.

In an embodiment of the disclosure, when viewed from above the rear surface of the first part 401, a short-end of the first portion 1211 (the end of the first portion 1211 close to the third point P3) and a short-end of the second portion 1231 (the end of the second portion 1231 close to the fourth point P4) may overlap each other in the state in which the electronic device 1101 is folded.

In an embodiment of the disclosure, when viewed from above the rear surface of the first part 401, an open-end of the first portion 1211 (the end of the first portion 1211 far from the third point P3) and an open-end of the second portion 1231 (the end of the second portion 1231 far from the fourth point P4) may overlap each other in the state in which the electronic device 1101 is folded.

In an embodiment of the disclosure, the third point P3 of the first portion 1211 and the fourth point P4 of the second portion 1231 may correspond to each other. For example, when viewed from above the rear surface of the first part 401 in the state in which the electronic device 1101 is folded, the third point P3 of the first portion 1211 may substantially overlap the fourth point P4 of the second portion 1231. As another example, even if the third point P3 and the fourth point P4 do not overlap in the state in which the electronic device 1101 is folded, the third point P3 and the fourth point P4 may be arranged to be biased to the same side of the first portion 1211 and the second portion 1231 (e.g., the left in the illustration of FIG. 15B).

In an embodiment of the disclosure, in the folded state, the electronic device 1101 may control the phase shifter 370 such that the phase of the first signal fed to the third point P3 of the first portion 1211 via the first PAM 540-1 and the phase of the second signal fed to the fourth point P4 of the second portion 1231 via the first PAM 540-1 are in phase. As another embodiment of the disclosure, in the unfolded state, the electronic device 1101 may control the phase shifter 370 such that the phase of the first signal fed to the first point P1 of the first portion 1211 via the first PAM 540-1 and the phase of the second signal fed to the fourth point P4 of the second portion 1231 via the first PAM 540-1 are out of phase. As another example, the phase of the first signal fed to the first point P1 of the first portion 1211 via the first PAM 540-1 and the phase of the second signal fed to the fourth point P4 of the second portion 1231 via the second PAM 540-2 may be in phase or out of phase.

Figure 15C:
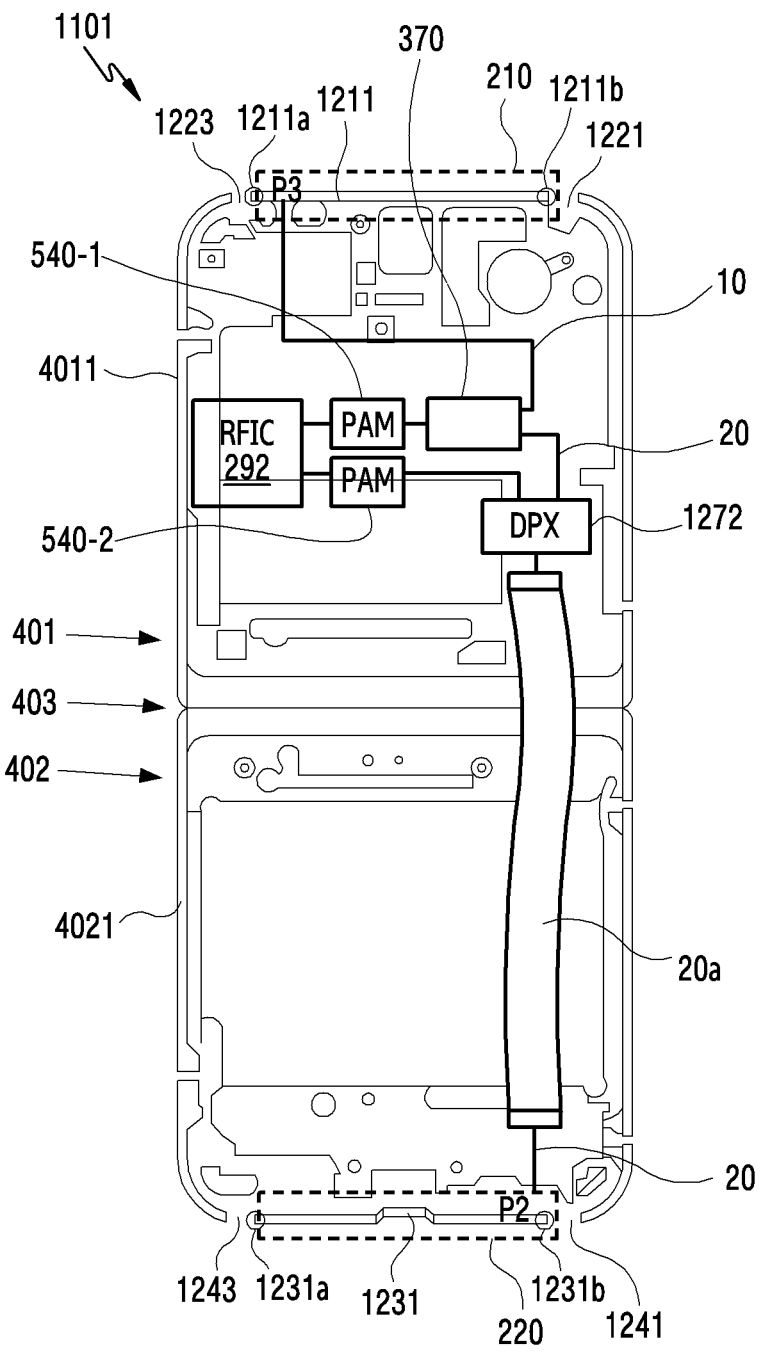
FIG. 15C illustrates an electronic device according to an embodiment of the disclosure.

FIG. 15C illustrates an electronic device according to an embodiment of the disclosure.

Redundant descriptions of components of FIG. 15C having the same reference numerals as those described above will be omitted.

Referring to FIG. 15C, in an embodiment of the disclosure, the first portion 1211 may be fed with power at the third point P3 via the first path 10 from the RFIC 292 and may operate as the first antenna 210 configured to transmit and/or receive an RF signal of a predetermined band. In an embodiment of the disclosure, the first portion 1211 may include a conductive material.

In an embodiment of the disclosure, the second portion 1231 may be fed with power at the second point P2 via the second path 20 from the RFIC 292 and may operate as the second antenna 220 configured to transmit and/or receive an RF signal of a predetermined band.

In an embodiment of the disclosure, when viewed from above the rear surface of the first part 401, a first end 1211a of the first portion 1211 (the end of the first portion 1211 close to the third point P3) and a second end 1231a of the second portion 1231 (the end of the second portion 1231 far from the second point P2) may overlap each other in the state in which the electronic device 1101 is folded.

In an embodiment of the disclosure, when viewed from above the rear surface of the first part 401, a third end 1211b of the first portion 1211 (the end of the first portion 1211 close to the first point P1) and a fourth end 1231b of the second portion 1231 (the end of the second portion 1231 close to the second point P2) may overlap each other in the state in which the electronic device 1101 is folded.

In an embodiment of the disclosure, the third point P3 of the first portion 1211 and the second point P2 of the second portion 1231 may be placed to be biased in different directions. For example, when viewed from above the rear surface of the first part 401 in the state in which the electronic device 1101 is folded, the third point P3 of the first portion 1211 may substantially overlap the fourth point P4 of the second portion 1231.

In an embodiment of the disclosure, in the folded state, the electronic device 1101 may control the phase shifter 370 such that the phase of the first signal fed to the third point P3 of the first portion 1211 via the first PAM 540-1 and the phase of the second signal fed to the second point P2 of the second portion 1231 via the first PAM 540-1 are out of phase.

Figure 16:
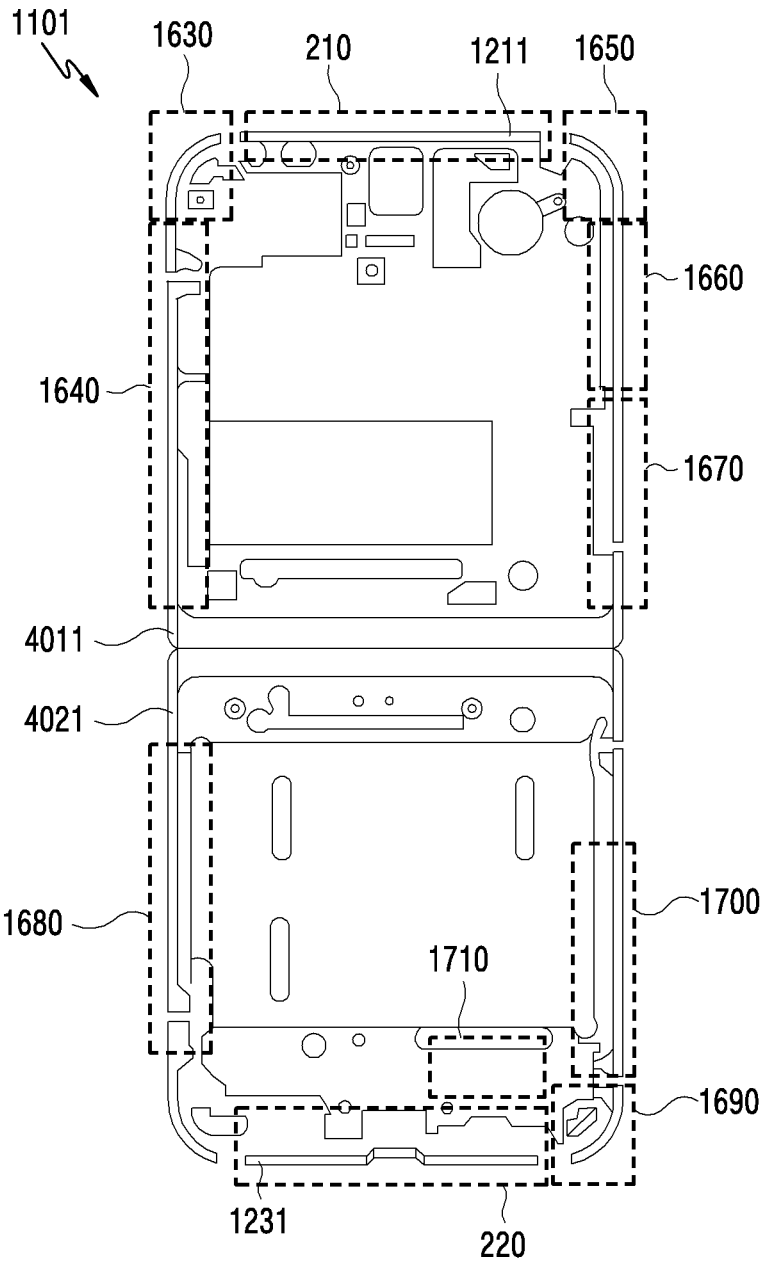
FIG. 16 illustrates an electronic device including a plurality of antennas according to an embodiment of the disclosure.

FIG. 16 illustrates an electronic device including a plurality of antennas according to an embodiment of the disclosure.

Redundant descriptions of components of FIG. 16 having the same reference numerals as those described above will be omitted.

Referring to FIG. 16, an electronic device 1101 according to an embodiment may include a third antenna 1630, a fourth antenna 1640, a fifth antenna 1650, a sixth antenna 1660, a seventh antenna 1670, an eighth antenna 1680, a ninth antenna 1690, a tenth antenna 1700, and/or an eleventh antenna 1710.

In an embodiment of the disclosure, the first antenna 210, the third antenna 1630, the fourth antenna 1640, the fifth antenna 1650, the sixth antenna 1660, and/or the seventh antenna 1670 may be disposed along the periphery of the first side surface member 4011 and may include a portion of the first side surface member 4011 as an antenna radiator. As another example, the first antenna 210, the third antenna 1630, the fourth antenna 1640, the fifth antenna 1650, the sixth antenna 1660, and/or the seventh antenna 1670 may be configured with a conductive pattern disposed inside the first part 401 without including a portion of the first side surface member 4011 as a radiator.

In an embodiment of the disclosure, the first antenna 210 may be configured to transmit and/or receive an RF signal corresponding to a first predetermined frequency band. For example, the first predetermined frequency band may include the LB.

In an embodiment of the disclosure, the third antenna 1630 may be configured to transmit and/or receive an RF signal corresponding to a third predetermined frequency band. For example, the third predetermined frequency band may include at least one of a frequency band for GPS communication, the MB, and/or a frequency band for Wi-Fi communication.

In an embodiment of the disclosure, the fourth antenna 1640 may be configured to transmit and/or receive an RF signal corresponding to a fourth predetermined frequency band. For example, the fourth predetermined frequency band may include at least one of the LB and/or UHB.

In an embodiment of the disclosure, the fifth antenna 1650 may be configured to transmit and/or receive an RF signal corresponding to a fifth predetermined frequency band. For example, the fifth predetermined frequency band may include at least one of the HB and/or UHB.

In an embodiment of the disclosure, the sixth antenna 1660 may be configured to transmit and/or receive an RF signal corresponding to a sixth predetermined frequency band. For example, the sixth predetermined frequency band may include the frequency band for Wi-Fi communication.

In an embodiment of the disclosure, the seventh antenna 1670 may be configured to transmit and/or receive an RF signal corresponding to a seventh predetermined frequency band. For example, the seventh predetermined frequency band may include at least one of the HB and/or the frequency band for Wi-Fi communication.

In an embodiment of the disclosure, the second antenna 220, the eighth antenna 1680, the ninth antenna 1690, and/or the tenth antenna 1700 may be disposed along the periphery of the second side surface member 4021 and may include a portion of the second side surface member 4021 as an antenna radiator. As another example, the second antenna 220, the eighth antenna 1680, the ninth antenna 1690, and/or the tenth antenna 1700 may be configured with a conductive pattern disposed inside the second part 402 without including a portion of the second side surface member 4021 as a radiator.

In an embodiment of the disclosure, the eleventh antenna 1710 may be disposed inside the second side surface member 4021. For example, the eleventh antenna 1710 may include a microstrip antenna provided on a printed circuit board disposed inside the second part 402.

In an embodiment of the disclosure, the second antenna 220 may be configured to transmit and/or receive an RF signal corresponding to a second predetermined frequency band. For example, the second predetermined frequency band may include the LB.

In an embodiment of the disclosure, the eighth antenna 1680 may be configured to transmit and/or receive an RF signal corresponding to an eighth predetermined frequency band. For example, the eighth predetermined frequency band may include at least one of the MB and/or HB.

In an embodiment of the disclosure, the ninth antenna 1690 may be configured to transmit and/or receive an RF signal corresponding to a ninth predetermined frequency band. For example, the ninth predetermined frequency band may include at least one of the MB and/or HB.

In an embodiment of the disclosure, the tenth antenna 1700 may be configured to transmit and/or receive an RF signal corresponding to a tenth predetermined frequency band. For example, the tenth predetermined frequency band may include the UHB.

In an embodiment of the disclosure, the eleventh antenna 1710 may be configured to transmit and/or receive an RF signal corresponding to an eleventh predetermined frequency band. For example, the tenth predetermined frequency band may include the UHB.

In an embodiment of the disclosure, at least two of the first antenna 210, the second antenna 220, the third antenna 1630, the fourth antenna 1640, the fifth antenna 1650, the sixth antenna 1660, the seventh antenna 1670, the eighth antenna 1680, the ninth antenna 1690, the tenth antenna 1700, and the eleventh antenna 1710 may be operated as antennas for multiple input multiple output (MIMO) communication.

An electronic device according to various embodiments may include a housing including a first part, a second part, and a connecting portion disposed between the first part and the second part, wherein the first part is coupled to the connecting portion to be rotatable relative to the second part, a first antenna including a first portion of the first part, a second antenna including a second portion of the second part, a power distribution circuit electrically connected to the first point of the first antenna via a first path and electrically connected to the second point of the second antenna via a second path longer than the first path, a wireless communication circuit electrically connected to the first antenna and the second antenna via the power distribution circuit, and at least one element disposed on at least one of the first path and the second path and configured to adjust a phase of an RF signal provided from the wireless communication circuit. In a state in which the housing is folded, the first point of the first antenna may correspond to the second point of the second antenna.

The electronic device according to an embodiment may include a first element disposed on the first path and a second element disposed on the second path.

According to an embodiment of the disclosure, the first element may include a capacitor having a predetermined capacitance value, and the second element may include an inductor having a predetermined inductance value.

According to an embodiment of the disclosure, the first element and the second element may include a variable capacitor.

The electronic device according to an embodiment may include a third element connected in parallel with the first element in the first path.

According to an embodiment of the disclosure, the third element may include an inductor having a predetermined inductance value.

The electronic device according to an embodiment may include a fourth element disposed on the second path between the second element and the second antenna.

According to an embodiment of the disclosure, the fourth element may include an inductor having a predetermined inductance value.

The electronic device according to an embodiment may include a first switch disposed between the power distribution circuit and the RFIC, and a second switch disposed on the second path between the second element and the second antenna. The first switch may be configured to selectively electrically connect the RFIC to the power distribution circuit or the second switch, and the second switch may be configured to selectively electrically connect the second antenna to the power distribution circuit or the first switch.

The electronic device according to an embodiment may include a third switch disposed between the RFIC and the first antenna, and the third switch may be configured to selectively electrically connect the first antenna to the power distribution circuit or the RFIC.

The electronic device according to an embodiment may include a first lumped element disposed between the first element and the first antenna in the first path, and a second lumped element disposed between the second element and the second antenna in the second path.

The electronic device according to an embodiment may include a flexible circuit board disposed over the first part and the second part across the connecting portion, and at least a portion of the second path may be provided by the flexible printed circuit board.

According to an embodiment of the disclosure, the first portion of the first part and the second portion of the second part may overlap each other in the state in which the electronic device is folded.

According to an embodiment of the disclosure, the housing may have a predetermined length and a predetermined width shorter than the predetermined length in a state in which the electronic device is unfolded and may be configured to be foldable about an axis parallel to the length direction of the housing, and open-ends of the first antenna and the second antenna may be directed outward from the connecting portion.

According to an embodiment of the disclosure, the housing may have a predetermined length and a predetermined width shorter than the predetermined length in a state in which the electronic device is unfolded and may be configured to be foldable about an axis parallel to the width direction of the housing.

The electronic device according to an embodiment may include split portions disposed at opposite ends of the first portion of the first part, and the split portions may have a predetermined permittivity.

An electronic device according to various embodiments may include a housing including a first side surface member, a second side surface member, and a hinge structure disposed between the first side surface member and the second side surface member, wherein the first side surface member is coupled to the hinge structure to be rotatable relative to the second side surface member, a flexible display disposed in a recess defined by the first side surface member and the second side surface member, a first antenna including a first portion of the first side surface member, a second antenna including a second portion of the second side surface member, a power distribution circuit electrically connected to a first point of the first antenna via a first path and electrically connected to a second point of the second antenna via a second path longer than the first path, a wireless communication circuit electrically connected to the first antenna and the second antenna via the power distribution circuit, a first element disposed on the first path, and a second element disposed on the second path. In a state in which the housing is folded, the first antenna may overlap the second antenna, in the state in which the housing is folded, the first point may overlap the second point, and the first element and the second element may be configured to adjust the phases of RF signals provided from the wireless communication circuit.

According to an embodiment of the disclosure, the first element may include a capacitor having a predetermined capacitance value, and the second element may include an inductor having a predetermined inductance value.

The electronic device according to an embodiment may include a third element connected in parallel with the first element in the first path, and a fourth element disposed on the second path between the second element and the second antenna. The first element and the second element may include a variable capacitor, the third element may include an inductor having a predetermined inductance value, and the fourth element may include an inductor having a predetermined inductance value.

The electronic device according to an embodiment may include a first switch disposed between the power distribution circuit and an RFIC, and a second switch disposed on the second path between the second element and the second antenna. The first switch may be configured to selectively electrically connect the RFIC to the power distribution circuit or the second switch, and the second switch may be configured to selectively electrically connect the second antenna to the power distribution circuit or the first switch.

Advantageous effects obtainable from the disclosure may not be limited to the above mentioned effects, and other effects which are not mentioned may be clearly understood, through the following descriptions, by those skilled in the art to which the disclosure pertains.

The methods according to various embodiments described in the claims or the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a housing including a first part, a second part, and a connecting portion disposed between the first part and the second part, wherein the first part is coupled to the connecting portion to be rotatable to the second part;
a first antenna including a first portion of the first part;
a second antenna including a second portion of the second part;
a power distribution circuit electrically connected to a first feed point of the first antenna via a first path and electrically connected to a second feed point of the second antenna via a second path longer than the first path, wherein, in a state in which the housing is folded, the first feed point in which a first radio frequency (RF) signal for the first antenna is fed corresponds to the second feed point in which a second RF signal for the second antenna is fed;
a wireless communication circuit electrically connected to the first antenna and the second antenna via the power distribution circuit; and
at least one element disposed on at least one of the first path or the second path and configured to adjust a phase of at least one of the first RF signal or the second RF signal such that a difference between a phase of the first RF signal and a phase of the second RF signal is within a range.

2. The electronic device of claim 1, wherein the at least one element comprises a first element disposed on the first path, and a second element disposed on the second path.

3. The electronic device of claim 2,
wherein the first element comprises a capacitor having a predetermined capacitance value, and
wherein the second element comprises an inductor having a predetermined inductance value.

4. The electronic device of claim 2, wherein each of the first element and the second element comprises a variable capacitor.

5. The electronic device of claim 4, further comprising:
a third element connected in parallel with the first element in the first path.

6. The electronic device of claim 5, wherein the third element comprises an inductor having a predetermined inductance value.

7. The electronic device of claim 4, further comprising:
a fourth element disposed on the second path between the second element and the second antenna.

8. The electronic device of claim 7, wherein the fourth element comprises an inductor having a predetermined inductance value.

9. The electronic device of claim 2, further comprising:
a first switch disposed between the power distribution circuit and a radio frequency integrated circuit (RFIC) corresponding to the wireless communication circuit; and
a second switch disposed on the second path between the second element and the second antenna,
wherein the first switch is configured to selectively electrically connect the RFIC to the power distribution circuit or the second switch, and
wherein the second switch is configured to selectively electrically connect the second antenna to the power distribution circuit or the first switch.

10. The electronic device of claim 9, further comprising:
a third switch disposed between the RFIC and the first antenna,
wherein the third switch is configured to selectively electrically connect the first antenna to the power distribution circuit or the RFIC.

11. The electronic device of claim 2, further comprising:
a first lumped element disposed between the first element and the first antenna in the first path; and
a second lumped element disposed between the second element and the second antenna in the second path.

12. The electronic device of claim 1, further comprising:
a flexible printed circuit board disposed over the first part and the second part across the connecting portion,
wherein at least a portion of the second path is included in the flexible printed circuit board.

13. The electronic device of claim 1, wherein the first portion of the first part and the second portion of the second part overlap each other in the state in which the housing is folded.

14. The electronic device of claim 1,
wherein the housing has a predetermined length and a predetermined width shorter than the predetermined length in a state in which the housing is unfolded, and is foldable about an axis parallel to a length direction of the housing, and
wherein open-ends of the first antenna and the second antenna are directed outward from the connecting portion.

15. The electronic device of claim 1, wherein the housing has a predetermined length and a predetermined width shorter than the predetermined length in a state in which the housing is unfolded, and wherein the housing is foldable about an axis parallel to a width direction of the housing.

16. The electronic device of claim 1, further comprising:

split portions disposed at opposite ends of the first portion of the first part, wherein the split portions have a predetermined permittivity.

17. An electronic device comprising:

a housing including a first part including a first side member, a second part including a second side member, and a hinge structure connecting the first part and the second part, wherein the first part is coupled to the hinge structure to be rotatable to the second part;

a flexible display;

a first antenna including a first portion of the first side member;

a second antenna including a second portion of the second side member, wherein, in a state in which the housing is folded, the first antenna overlaps the second antenna;

a power distribution circuit electrically connected to a first feed point of the first antenna via a first path and electrically connected to a second feed point of the second antenna via a second path longer than the first path, wherein, in the state in which the housing is folded, the first feed point in which a first radio frequency (RF) signal for the first antenna is fed corresponds to the second feed point in which a second RF signal for the second antenna is fed;

a wireless communication circuit electrically connected to the first antenna and the second antenna via the power distribution circuit; and at least one lumped element disposed on at least one of the first path or the second path and configured to adjust a phase of at least one of the first RF signal or the second RF signal, such that a difference between a phase of the first RF signal and a phase of the second RF signal is within a range.

18. The electronic device of claim 17, wherein the at least one lumped element includes a first lumped element and a second lumped element, wherein the first lumped element includes a capacitor having a predetermined capacitance value, and wherein the second lumped element includes an inductor having a predetermined inductance value.

19. The electronic device of claim 18, wherein the at least one lumped element further includes:

a third lumped element connected in parallel with the first lumped element in the first path; and a fourth lumped element disposed on the second path between the second lumped element and the second antenna, wherein the third lumped element includes an inductor having a predetermined inductance value, and wherein the fourth lumped element includes an inductor having a predetermined inductance value.

20. The electronic device of claim 18, further comprising:

a first switch disposed between the power distribution circuit and a radio frequency integrated circuit (RFIC) corresponding to the wireless communication circuit; and a second switch disposed on the second path between the second lumped element and the second antenna, wherein the first switch is configured to selectively electrically connect the RFIC to the power distribution circuit or the second switch, and wherein the second switch is configured to selectively electrically connect the second antenna to the power distribution circuit or the first switch.

* * * * *